United States Patent [19]

Shepherd

[11] Patent Number: 5,032,230
[45] Date of Patent: Jul. 16, 1991

[54] VACUUM DRAFT SUBMERGED COMBUSTION SEPARATION SYSTEM

[75] Inventor: Richard C. Shepherd, White, Ga.

[73] Assignee: Deep Woods, Inc., Kennesaw, Ga.

[21] Appl. No.: 234,638

[22] Filed: Aug. 22, 1988

[51] Int. Cl.⁵ .............. B01D 1/14; C02F 1/10
[52] U.S. Cl. ................... 202/176; 202/181; 202/185.2; 202/185.3; 202/200; 202/205; 202/234; 126/360 A; 159/16.2; 159/47.3; 159/905; 203/11; 203/49; 203/50; 203/100; 210/708
[58] Field of Search .............. 202/205, 176, 202, 200, 202/234, 203, 182, 181, 185.2, 185.3, 185.1; 203/10, 11, 1, 41, 49, 100, 50, 39; 159/16.2, 47.3, 905; 210/708, 198.1; 126/368, 360 A

[56] References Cited

U.S. PATENT DOCUMENTS

| | | | |
|---|---|---|---|
| 2,890,166 | 6/1959 | Heinze | 203/100 |
| 3,080,302 | 3/1963 | Rogers et al. | 203/100 |
| 3,247,890 | 4/1966 | Williams | 203/100 |
| 3,285,834 | 11/1966 | Guerrieri et al. | 203/49 |
| 3,317,306 | 5/1967 | Getsinger et al. | 71/43 |
| 3,402,753 | 9/1968 | Thomas | 203/100 |
| 3,432,399 | 3/1969 | Schutt | 202/153 |
| 3,480,513 | 11/1969 | Martin | 202/202 |
| 3,642,583 | 2/1972 | Greenberg et al. | 203/100 |
| 3,732,911 | 5/1973 | Lowe et al. | 159/47 |
| 3,803,001 | 4/1974 | Carnavos | 203/11 |
| 3,933,600 | 1/1976 | Dodge | 203/10 |
| 4,030,985 | 6/1977 | Barba | 203/11 |
| 4,096,039 | 6/1978 | Carnine | 203/11 |
| 4,179,369 | 12/1979 | Bradley | 210/708 |
| 4,269,664 | 5/1981 | Younger | 202/185.2 |
| 4,534,828 | 8/1985 | Erickson et al. | 203/100 |

Primary Examiner—Wilbur Bascomb
Attorney, Agent, or Firm—Kerkam, Stowell, Kondracki & Clarke

[57] ABSTRACT

A vacuum draft submerged combustion system and method for separating combustible hydrocarbons and other components or liquid solutions from their solvents, usually water, includes evaporating volatile components by a submerged combustion burner and condensing the vaporized volatile components under a partial vacuum. The hot gases from the burner are injected under partial vacuum into the first tank. The hot gases bubbled through the solution cause volatile components in the liquid to be evaporated and collected above the level of the liquid. The collected gasses are drawn into a condensing tank where the condensable particulates are condensed and collected.

11 Claims, 3 Drawing Sheets

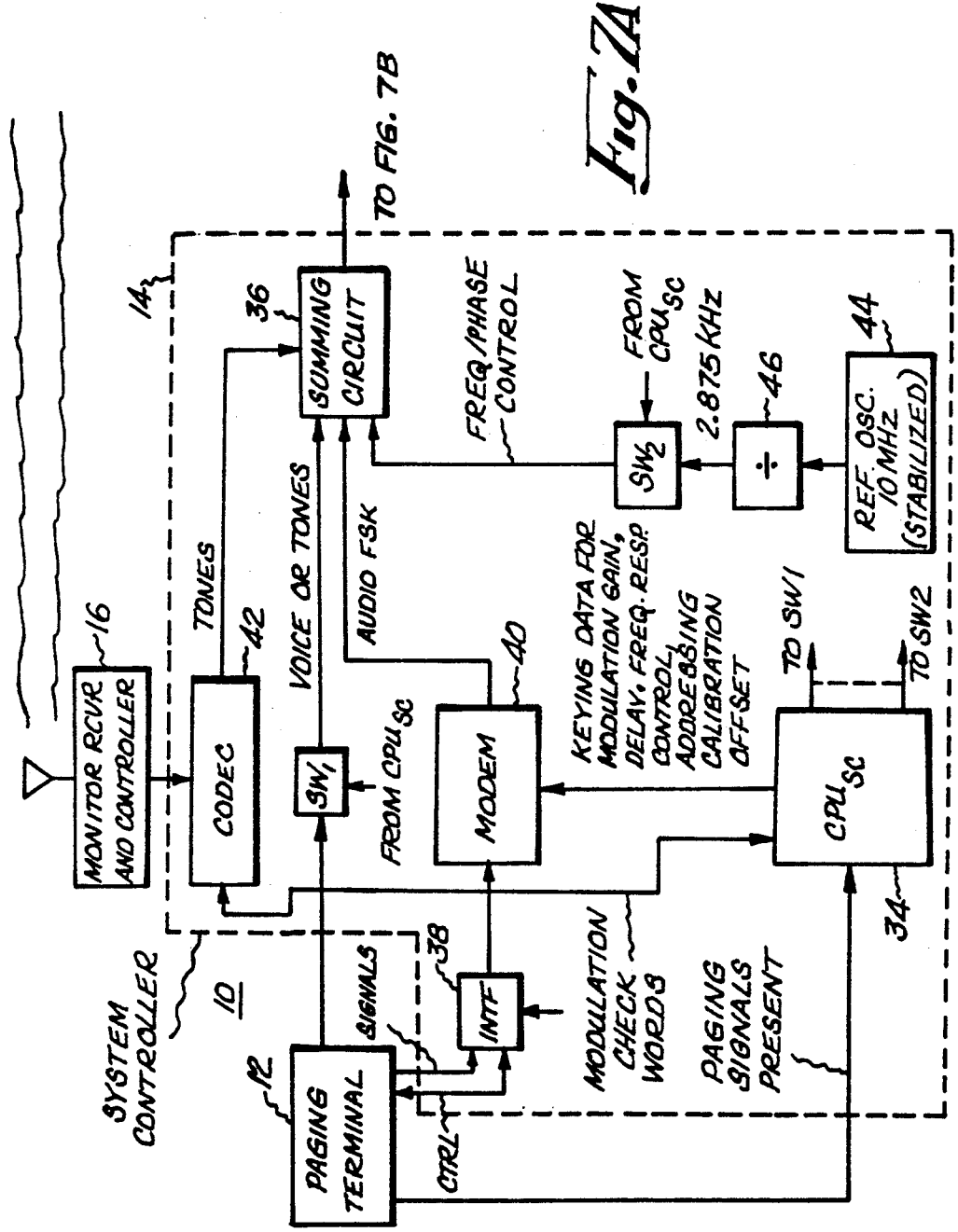

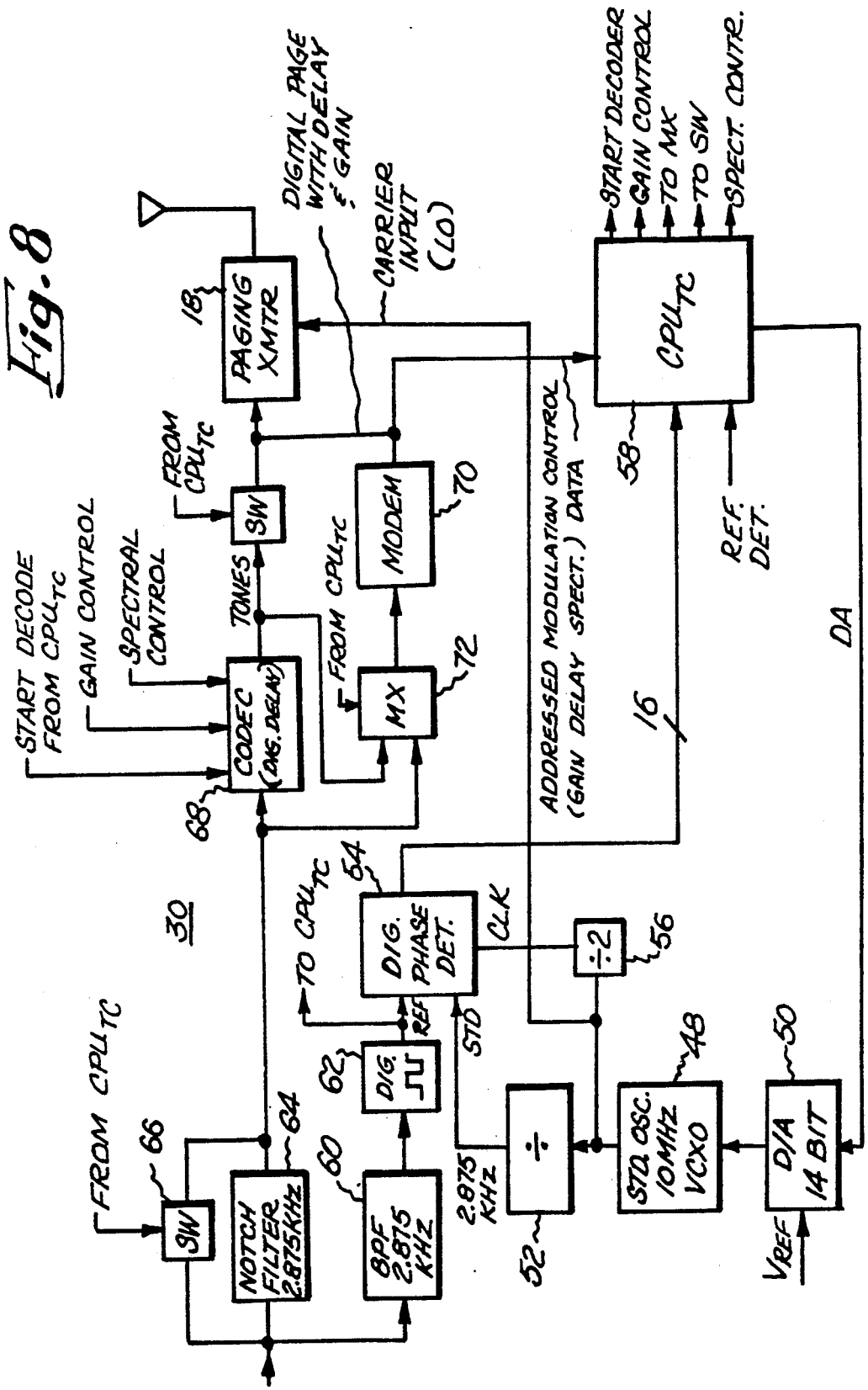

FREQUENCY, PHASE AND MODULATION CONTROL SYSTEM WHICH IS ESPECIALLY USEFUL IN SIMULCAST TRANSMISSION SYSTEMS

DESCRIPTION

Introduction

The present invention relates to a system (method and apparatus) for controlling the frequency and phase of an oscillator which may be used to generate a carrier which can be modulated for communication purposes; the system also being adapted to control the modulation.

The system is especially suitable for use in simulcast systems for monitoring and automatic control of the carrier frequency of simulcast transmitters and also for modulation matching of the transmitters (simulcast adjustment) whereby to reduce signal degradation due to interference in zones where transmissions from different transmitters overlap. The system is generally useful in applications which require precise time and/or frequency standards. Thus the system may be used in providing a time or frequency standard referenced to an accepted absolute standard such as a governmental transmission from WWVB in the United States or MSF in England, or to relative reference signals based on standards contained within an application system such as reference frequency oscillators, sometimes called disciplined oscillator systems (see, e.g., U.S. Pat. No. 4,528,685 issued June 25, 1985 to Robert J. Hesselberth, Thomas P. Donaher and Joel E. Sandahl).

BACKGROUND

Frequency and phase controllers, such as disciplined oscillators as described in the above-referenced U.S. patent and also the Stratum 2 disciplined oscillator sold by Spectracom Corporation, East Rochester, New York 14445 U.S., have used digital techniques for locking a standard oscillator to a reference and even removing long term phase and frequency variations to high degrees of precision. In such systems the reference frequency source is reliable (essentially uncorrupted by noise and other errors) for long periods of time, or the reference frequency source is located close by the controlled standard source and provides continuous, essentially noise and error free reference signals. The reference signals are also available at high frequencies, for example 10 Mhz so that frequency and phase errors are detected quickly while the reference is monitored.

In such applications as simulcast transmission systems where precise frequency control is required so as to prevent interference in zones where transmissions from different transmitters overlap, and in other applications where frequency and/or phase control of the local standard signal source is required, a local reference signal is not available. It is desirable that the signal be transmitted to sites remote from the reference source. This, however, adds noise and other errors which cause the phase of the reference to jitter and the reference to vary in amplitude. Also, there may not be a separate link for reference signals over which the reference frequency can be transmitted at high frequency. It is desirable to place the reference frequency within the band width of the other signals which are being communicated for transmission. In simulcast transmission these signals occupy the voice band width (300 to 3,000 Hz). The problem is exacerbated in simulcast transmission since customer traffic (pages in paging simulcast systems) must be given preference to calibration of the transmitters to the precise carrier frequencies required for proper system performance. Thus, it is desirable that the frequency calibration be carried out using information which is available only intermittently, perhaps at times separated by hours, and yet maintain the requisite precise frequency control of all of the transmitters.

In simulcast transmission systems frequency control is conventionally accomplished by technicians who must visit the remote transmitter sites and align the transmitters in frequency. Alignment of the transmitter's modulation characteristics (delay, gain, manually at the transmitter sites. If the modulation characteristics of the transmitters are not aligned, interference arises particularly in zones where the transmissions overlap. It is desirable that such alignment be carried out automatically, on a regular schedule or at times when the traffic carried by the system is light.

SUMMARY OF THE INVENTION

It is the principal object of this invention to provide an improved system (method and apparatus) for calibrating a standard signal source is frequency and/or phase to a supplied reference signal which has the following characteristics: the reference and standard may be local or remote from each other and from the system which provides the calibrating adjustments; the reference and/or the standard signals may have dynamically varying components of noise and other error signals added to them; the reference signal may be transmitted over a low frequency (e.g. voice band width) link thereby enabling the link to be shared with other signals such as control tones for other alignment (e.g. in modulation characteristics) purposes; the quality of the reference signal (e.g. the spectral density of the noise and error signals) from the interconnecting link can be measured by the same process as provides for the calibration of the standard signal source; the reference and/or standard signals may be intermittently supplied even over extended periods of time; the rapidity at which the calibration and adjustment of the standard is carried out is variable; even long term variations in frequency and/or phase (second order standard signal errors due to aging of components of the standard frequency source, such as the quartz crystal of a variable frequency quartz crystal controlled oscillator used as the standard source) are accounted for in the adjustment; the precision of frequency and/or phase control (e.g. to parts per million or better) may be increased to high levels if desired; the standard may have a selected frequency offset with respect to the reference and remain locked in frequency to the reference with the offset.

Briefly described, a system for providing a signal controlled in frequency, in accordance with the invention, uses means for providing a source of reference signals and means for providing a source of a standard signal which is responsive to a frequency error signal. Means are provided for making measurements of the relative phase difference between the reference and standard signals at a plurality of times spaced in duration from each other. Means are also provided for translating the ratio of the difference in the phase measurements to the duration into the frequency error signal. This frequency error signal is then applied to the standard so as to precisely control the frequency thereof.

It is a further object aspect of the invention to provide, in communication systems where signals are transmitted simultaneously by a plurality of transmitters (i.e. simulcast transmission systems), improvements which enable matching of the transmitted signals in their modulation characteristics (e.g. delay, gain, and spectrum) thereby aligning the transmitters and avoiding interference and distortion in zones where transmissions overlap.

Briefly described, a communications system (simulcast transmission system) embodying the modulation characteristic matching aspect of the invention, utilizes means for transmitting alignment signals (control tones) or other alignment signals to transmitter controllers for each transmitter in the system. The transmitter controllers include circuits in the modulating signal paths to the transmitters for controlling the characteristics of the modulating signals (inserted delay, gain, and spectrum). During alignment the control signals are generated in a system controller at the control station or terminal of the system. A receiver receives the transmissions from the transmitters. The system controller multiplexes the transmission and reception of the control and alignment signals and correlates them to derive digital control signals which are addressed to each of the transmitters. These digital signals contain data for controlling the modulation characteristic control circuits such that the modulation characteristics of all transmitters become automatically matched and aligned.

Principles of the Invention

The principles of the invention will be better understood with reference to FIGS. 1 through 6 of the drawings which show curves explanatory thereof. FIG. 1 is a graph of phase measurements of the phase difference over time for a given frequency difference between the reference and standard signals. These phase measurements, may and in a system containing a preferred embodiment of the invention are, generated by a digital counter gated by a signal representing the phase difference between the reference and standard signals. Considering that the reference signal is used to start the phase difference gate signal, positive slopes indicate that the standard is lower in frequency than the reference. Conversely, a negative slope indicates that the standard is higher in frequency than the reference. The magnitude of the slope is a direct expression of the scalar quantity, frequency error. The graph in FIG. 1 is idealized in that the measurements are not perturbed by noise. In practical applications, as discussed above, it is desirable for the reference and/or standard source to be remotely located and interconnected via some medium (link) which can introduce significant components of noise. FIG. 2 graphs typical phase measurements over time where noise is present. While the actual frequency error between the reference and standard signals has not changed, the "measured" frequency error becomes dependent on the actual moment that initial and final phase measurements are taken. This principle is shown in greater detail in FIG. 3.

In FIG. 3 the solid straight line is the actual frequency error. The curved, wiggly line shows the actual phase measurements perturbed by noise. The dash line indicates the computed frequency error based on the initial and final phase measurements over a hundred second period which is presented by way of illustration. The ordinate of the graph in FIG. 3 represents the phase measurement in terms of counts and assumes a phase measurement clock of 1 Mhz thereby making the maximum phase measurement for one cycle or wrap (360° of phase difference) equal to 999. In this idealized representation there is a given frequency error and the phase detector is operative at 1,000 Hz (1,000 microseconds (us)per period.) The computed or measured frequency error and the actual frequency error differ by more than two to one. Inasmuch as noise (errors) are linearly additive, the error of the measured frequency error approaches zero error as the measurement interval approaches infinity. For example, in FIG. 3 increasing the period to two hundred seconds could decrease the measurement error to ten percent. However, infinity is a very long time to wait to determine the frequency error and it is impractical to use an extremely long measurement interval to calibrate the standard source. Using prolonged measurement intervals is also impractical since the noise power (the source of the error) is not known and may be varying throughout the interval that the measurement is made.

In accordance with the invention these problems are overcome by rapidly collecting a series (multiplicity of successive) of measurements and reducing these measurements to a single qualified value as though it were a single measurement. The principles are illustrated in FIG. 4 which is similar to FIG. 3 but has a much more compressed time scale. The variability of the measurements is influenced by the rate of the measurements and the interval over which they are taken. The upper frequency limit of the variability is established by the band width of the reference signal and also of the standard signal. The band width of the standard signal may be neglected if the standard oscillator is not remote from the control system which determines the frequency error so that the standard signal is not filtered. This is the case in the preferred embodiment of the invention described hereinafter. The reference signal is filtered. The upper frequency limit of the variability is then established by the band width of the band pass filter. The lower frequency limit goes to zero as the noise density on the reference signal approaches one at the phase detection frequency over the interval during which the phase measurements are taken. This is an unlikely event since the noise then would be at a single frequency. The lower frequency limit is, alternatively, the frequency where the total noise power goes to zero (noninterfering). The magnitude of the variability approaches the maximum phase measurement (the maximum count of the counter gated by the phase difference signal) as the signal to noise ratio of the reference signal goes to zero or the noise density goes to one at the phase detector frequency over the measurement interval. In other words, the band width of the band pass filters determines the rate of change in the noise that can influence the measurement thus, if the band width were infinitely narrow the measurement might change in amplitude but never in phase. A wider band width's noise components are transmitted, which in effect jitters the phase difference signal.

In FIG. 3 a sampling rate of every other cycle of the reference signal at the phase detector is assumed, therefore fifty cycles of the reference signal are sampled in 0.1 seconds. It will become apparent that in the preferred embodiment the reference signal frequency is 2875 Hz and sampling is done on alternate cycles or approximately every 700 microseconds (i.e. at a 1400 sample per second rate). This represents an over-sampling condition since the band width of the filters in the preferred embodiment is approximately 140 Hz. It is necessary to sample at a rate at least twice the band width (the Nyquist value) for minimum aliasing error. It is preferred to sample at a rate at least three times the band width. Then, the sample rate is at least three times the upper frequency limit of variability.

The interval of sampling should span a period equal to the lowest practical frequency component of variability based upon the noise environment (the noise component of the reference signal through the band pass filter). While the sampling rate is established at a high enough rate to assure the capturing of the magnitude of the variability of the measurements, the sampling interval is selected to place an upper bound on the error of the mean of the variability of the measurements. The measurements may be considered a sample set. Thus, in a practical system using a 2875 Hz reference, sampling over an interval of from 50 to 100 ms picks up the lowest frequency component of noise (jitter) reasonably expected to exist in the reference signal.

The exact interval may be determined experimentally by looking at the mean of the measurements as the intervals increase. When the variability of the mean becomes stable over an interval of measurement, a sampling period of that interval should be sufficient.

Referring to FIG. 4, if the interval were half as long as indicated the mean (average of all samples) would be much higher than shown for the 100 millisecond measurement interval indicated in FIG. 4. Thus, where the mean stops varying as the sampling period increases may be used as the criteria for selecting the sampling interval. Thus, the sampling interval is selected to place an upper bound on the error of the mean for the sample set.

For each collected sample set, which is collected at a particular time over a sampling interval, the mean and standard deviation and the time when the samples were taken is derived. The values of the mean and standard deviation are used to represent the data samples as a single phase measurement (datum). The mean is used as the effective phase measurement. The standard deviation is used as an expression of the relative uncertainty (potential error) in the mean. This error can be understood by examining FIGS. 5A and 5B.

FIG. 5A shows a case, idealized for purposes of explanation, where the variation in measured phase is sinusoidal. The mean error, as shown in FIG. 5B, results from the averaging of samples over intervals where the integral of noise is non-zero. FIGS. 5A and B show that the greater number of noise cycles, the lower the possible mean error. This illustrates the significance of the lower frequency limit of noise. For Gaussian noise sources, it is known that there is a very small probability (less than 0.3%) that any sample in the set differs from the mean by more than three standard deviations. Therefore, in the worst case, the samples of significance are spaced within six standard deviations about the mean. If the interval bounds the lower frequency components of variability, the mean error is likely to be less than 1.5 standard deviations (V/2 in FIG. 5B).

It is possible that the phase measurements taken at an initial time and a later time which are used to compute the frequency error (delta f over delta t or the slope of the relative phase versus time curve as shown in FIG. 1) are separated in time by more than a cycle of the frequency difference or 360° of phase. This is referred to as a "wrap". Thus, the measurement with one or more wraps may indicate minimum frequency error while the standard and reference signals may differ in frequency by several cycles. The effect of wrap is illustrated in FIG. 6 where $S_0$ is the time of the initial measurement and $S_1$, $S_2$ and $S_3$ are measurements made later in time. These may be made at regular time intervals, as shown, or at varying time intervals as is likely to be the case to accommodate priority to traffic in a communication system, such as a simulcast paging system. The actual measurements at $S_1$, $S_2$ and $S_3$ are labeled "a". It may be that the phase difference wrapped one or more times between the time of $S_0$ and the other measurements. The likelihood of a wrap is higher the further distant in time the measurement is. In the illustrated case, $S_2$ and $S_3$ have wrapped. $S_3$ wrapped twice, while $S_2$ wrapped once. The principle which takes into account wrapping is that if wrap is taken into account, then all of the measurements will be correlated. They can be considered to be correlated if they are within a certain multiple of their variability (e.g., standard deviation) from the phase along slopes defined by the initial and last measurement ($S_0$ and $S_3$ in the case illustrated in FIG. 6). In order to accommodate a reasonable amount of jitter as discussed above the limit of the variability is obtained using a multiplier of 1.5 or 1.5 standard deviations.

In the case illustrated in FIG. 6, it is apparent that the initial measurements provide slope b-1. The $S_1$ and $S_2$ points are beyond 1.5 standard deviations from the phase at $S_1$ and $S_2$ on the slope b-1. A wrap of one cycle of the latest measurement ($S_3$) is assumed and the phase of $S_3$ is adjusted by one wrap. A new slope b-2 is then assumed. For this slope, $S_1$ and $S_2$ are to the left (earlier in time) than the time of the wrap, which is the time where the slope b-2 intersects the one-wrap level. Accordingly, the measurements at $S_1$ and $S_2$ did not wrap. However, $S_1$ and $S_2$ are further than 1.5 standard deviations from the slope b-2. Accordingly another wrap of $S_3$ and a new slope b-3 is assumed. This slope is with another wrap added to the $S_3$ measurement. Now the $S_2$ measurement is to the right (later in time) than the intersection with the one-wrap level. It must then be that $S_2$ also wrapped and wrapped one cycle. $S_2$ is then adjusted. It will now be apparent that all of the measurements, as adjusted, correlate and are within 1.5 standard deviations of the slope. The frequency error is then the slope of line b-3.

In a practical system, as will be discussed in detail hereinafter, the number of wraps which can be accommodated will be related to the maximum frequency deviation or control range of the standard oscillator. If that range is plus or minus 10 cycles, up to plus or minus 10 wraps for the last measurement can be checked for correlation. If no correlation exists, then another measurement is taken. Assuming that only four measurements are used, one of the measurements which is closest in time to its preceding measurement (the shortest time or $S_1$ minus $S_0$, $S_2$ minus $S_1$, or $S_3$ minus $S_2$) determines whether $S_1$, $S_2$ or $S_3$ is removed. Then another measurement is taken and is used as the last measurement for determining the slope and frequency error. The measurements are then correlated for wraps. If no correlation is achieved in spite of a predetermined number of tests, an alarm indication will be provided to the system operator. Accordingly, the principles of operation of the system enable the use of measurements which are perturbed by noise and other errors or the measurements will not be made continuously but can be made intermittently and at different times.

The invention itself, as well as the foregoing and other objects and advantages thereof, will be apparent from FIGS. 1 through 6 and from FIGS. 7 through 12. FIGS. 1 through 6 were discussed above and these FIGS., as well as FIGS. 7 through 12, are described briefly as follows.

DESCRIPTION OF THE FIGS. OF THE DRAWING

Figure 1:
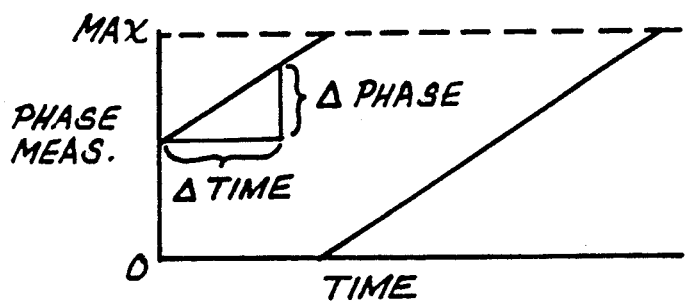
FIG. 1 is a graph showing relative phase versus time for a given frequency difference between a reference and a standard signal under noiseless conditions.
Figure 9A:
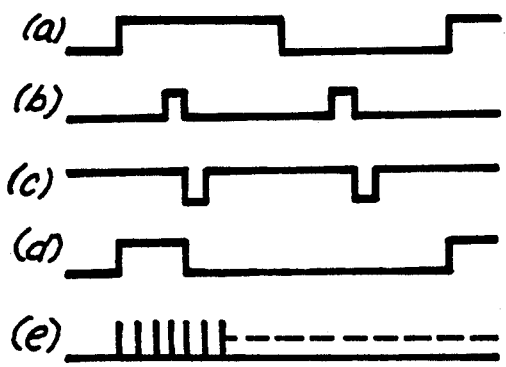
Figure 7B:
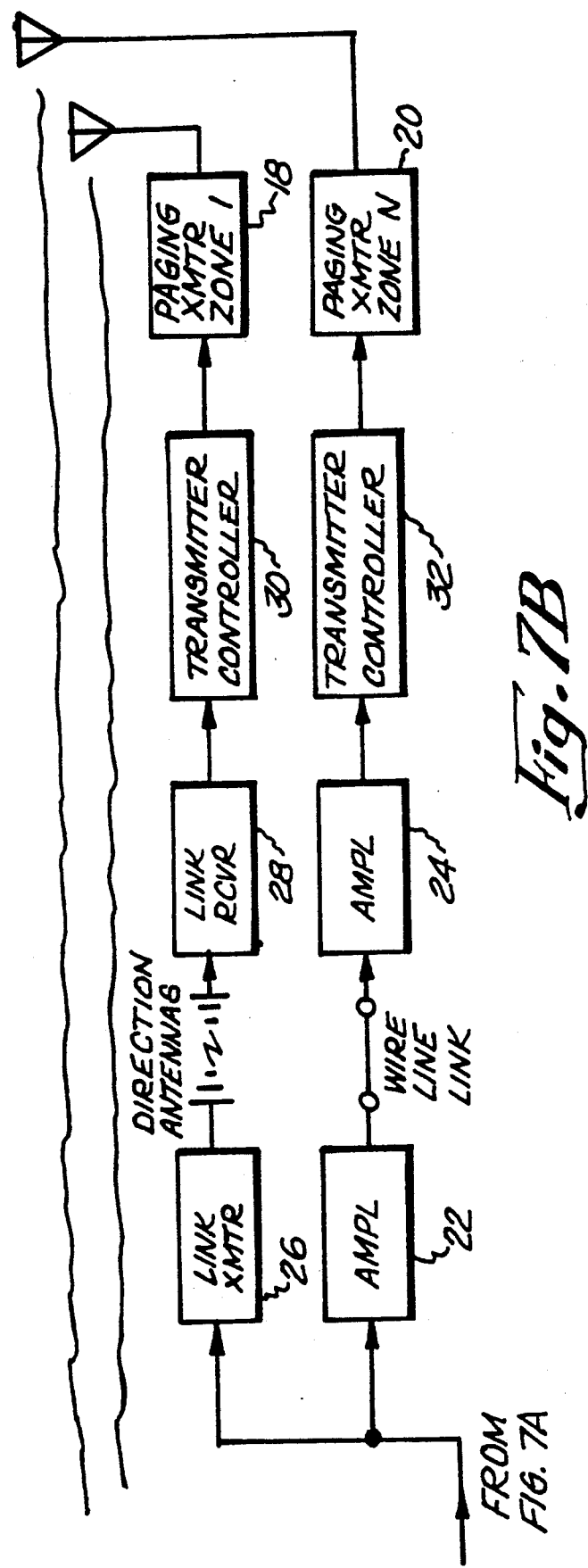
Figure 9:
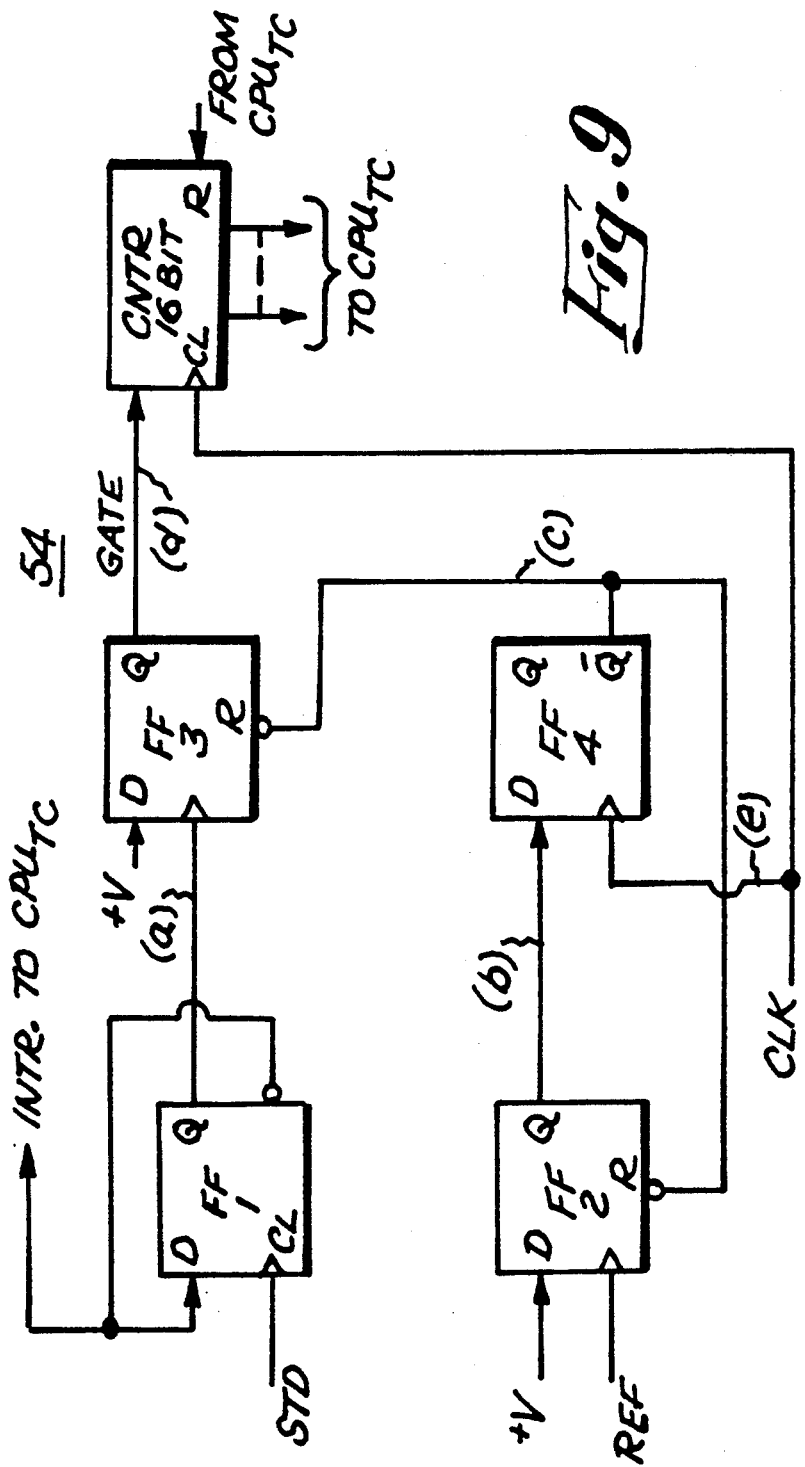

FIGS. 7A and B is a block diagram illustrating a simulcast paging system embodying the invention;

FIG. 8 is a block diagram illustrating the transmitter controller of the system shown in FIG. 1;

FIG. 9 is a block diagram illustrating the digital phase detector shown in FIG. 8;

FIG. 9A is a timing diagram illustrating the operation of the phase detector shown in FIG. 9; and FIGS. 10, 11A and 11B, and 12 are flowcharts illustrating the structure and format of the program of the central processing unit in the transmitter controllers of the system shown in FIGS. 7 and 8.

DESCRIPTION OF PREFERRED EMBODIMENT

Referring to FIG. 7, there is shown a simulcast paging system. The system has a control station or terminal 10. A paging terminal 12 is located at the control station together with a system controller 14 and a monitor receiver and controller 16. The station outputs a modulating signal over a voice band width (300 to 3,000 Hz) from the system controller. The signals transmitted may be voice or tones generated in the paging terminal 12. The signal also may be a digital signal which is transmitted by a frequency shift key transmission which is referred to as audio FSK.

The simulcast system may have a large number of transmitters each of which covers a different zone. A paging transmitter 18 for zone 1 and another paging transmitter 20 for zone N are shown. There may be hundreds of such transmitters each covering a different area or zone which overlaps so as to avoid any areas which do not receive signals from the control station 10. There also may be paging transmitters in the immediate vicinity of the control station 10. These close by transmitters can be connected by cables (not shown) to the system controller 14. More distant transmitters are connected over wire line links or by radio links such as via directional antennas. These wire line and radio links are conventional, and in the case of the wire line links, are shown as having amplifiers 22 and 24 at the opposite ends of the link. The radio links have a link transmitter 26 at the down-link end and a link receiver 28 at the up-link end. The signals over the links are used to modulate the paging transmitters. The signals are processed in transmitter controllers 30 and 32. One controller is provided for each paging transmitter. It provides the actual modulating signals to the paging transmitters. Modulation may be FM modulation as is conventional in paging systems. Other types of modulation can be used.

The system controller 14 has a microprocessor central processing unit 34 ($CPU_{sc}$). The $CPU_{sc}$ is responsive to a command from the paging terminal 12 indicating that the paging signals are present. It controls a switch, SW1, to connect the paging terminal to a summing circuit 36 for the transmission of voice signals or paging tones. The paging terminal may also generate digital signals which are connected through an interface 38 which may operate in accordance with a standard protocol to apply the digital signals in format for use by the paging receivers supplied to customers. This digital data is applied to a modem 40 when the interface is enabled by the $CPU_{sc}$. The modem 40 transmits the digital data as the audio FSK signals and applies them to the summing circuit 36.

The $CPU_{sc}$ also generates modulation check words which are applied to a CODEC (coder decoder) 42. This CODEC may be a commercially available chip and converts the modulation check word data into tones. The tones are also applied to the summing circuit 36. The $CPU_{sc}$ also generates keying data for modulation characteristic matching and alignment (i.e. gain, delay and frequency response control) or controlling various transmitters to transmit at a carrier frequency at or offset a predetermined number of cycles (Hz) from the standard carrier frequency. This keying data is addressed with address bits to different transmitters, and particularly to operate the transmitter controllers thereof. This keying data is applied to the modem 40 and transmitted as audio FSK digital data via the summing circuit to all of the paging transmitters.

The system controller 14 also has a reference signal generating source. This source may be a reference oscillator. A 10 MHz stabilized crystal oscillator (with a quartz crystal in an oven) may be used. The reference oscillator may also be a disciplined oscillator such as described in the above-referenced patent, or it may be a Stratum-type disciplined oscillator available from Spectracom Corporation. The reference oscillator 44 provides the reference frequency at 10 MHz which is divided after digitization in a digital divider or counter-chain 46. When the $CPU_{sc}$ closes a switch SW2, the control tone in the voice band is applied to the summing circuit 36. The control tone (the reference REF) is desirably at the high end of the band. The 2.875 KHz tone is suitable. It is transmitted with the other signals to the paging transmitters. The presence of the 2.875 KHz tone may be a signal to enable all of the transmitters to transmit, putting the simulcast system in broadcast or "on the air" mode. The absence of the 2.875 KHz tone would then be an inhibit on the transmitter. Thus, the reference may serve two purposes. However, it may be desirable to use another signal for transmitter enable and inhibit purposes. Then the 2.875 is turned on only at times of calibration of the standard frequency source 48 in the transmitter controllers.

The transmitter controllers are shown in FIG. 8. They include a standard oscillator, which in the illustrated system is a 10 MHz voltage controlled crystal oscillator (VCXO). The control voltage for correcting frequency errors is obtained from a digital to analog converter (D/A) 50 which is suitably a 14 bit D/A. The standard oscillator output is digitized into pulses and divided in a divider 52 to produce the 2.875 KHz standard signal for comparison with the reference is a digital phase detector 54. The digital phase detector is also clocked by the standard oscillator signal divided by 2 in a divider 56. The clock is therefore at approximately a 700 microsecond rate. The digital output from the phase detector 54 is then coherent (synchronized) with the standard oscillator frequency. The standard oscillator frequency is also used as the carrier input (local oscillator or LO input) to the paging transmitter 18 which is associated with the transmitter controller 30.

A microprocessor provides a central processing unit 58 in the transmitter controller and is referred to as the $CPU_{tc}$.

The reference signal is separated by a band pass filter 60. As mentioned in the foregoing discussion of the principles of the invention, the band width of this filter may be approximately 140 Hz. The output of the filter is digitized in a digitizer 62 which may be a squaring circuit. When the reference is present, the digitized output is present. This output may be detected by the $CPU_{tc}$ which will be inhibited from making a calibration measurement in the absence of the reference.

The reference is excluded from the path carrying the voice, tones or audio FSK digital signals (keying data or control tones from the CODEC 42 in the system controller 14) by notch filter 64 tuned to reject the 2.875 KHz reference. Under some circumstances, such as an alignment of spectral characteristics, it may be desirable to bypass the notch filter. Then, a switch (SW) 66 is closed in response to a command from the $CPU_{tc}$. Modulation check words (as control tones from the CODEC 42) are transmitted through a CODEC 68 which converts the tones and voice frequency signals into PCM (pulse code modulated) signals which are then decoded back into tones and applied to the paging transmitter. The modulation characteristics are adjusted in the CODEC 68.

The CODEC 68 has a start decode control, a gain control and a spectral control. The start decode is a digital command from the $CPU_{tc}$ which provides a digital delay between the tones at the input of the CODEC 68 and the tones of the output thereof. The gain control is by way of the digital word from the $CPU_{tc}$ which controls the PCM samples to adjust their amplitude, again for alignment or matching purposes. The spectral control is a word to a digital filter in the CODEC which controls the spectrum of the tones. Data for these digital words is generated in the $CPU_{sc}$ of the system controller 14. These digital words are transmitted via the modem 40 as audio FSK digital data addressed to the various transmitter controllers. The digital words are switched to a modem 70 in the transmitter controller 30 via a multiplexer switch 72 (MX). They are converted into addressed digital modulation control data. This data is accumulated in the $CPU_{tc}$ and applied to the CODEC 68 to align the modulation characteristics of the transmitted paging signals from the paging transmitter 18 with the modulation characteristics of the other N paging transmitters in the system.

In order to obtain this modulation control data, the modulation check words which are generated by the $CPU_{sc}$ 34 (FIG. 7A) are used. These modulation check words, translated into tones by the CODEC 42, are transmitted through the CODEC 68 as modulating signals to the paging transmitter 18. The modulating signals are returned to the monitor receiver 16. If desired, address signals may accompany the modulation check word tones so as to designate the particular paging transmitter which is then transmitting. The check tones are then digitized in the CODEC 42 of the system controller 14 and stored in a table in the memory of the $CPU_{sc}$. There they are correlated and necessary keying data for gain, delay and frequency response control addressed to particular paging transmitters is generated and transmitted via the audio FSK channel.

At the transmitter controller, the keying data is translated back into digital signals in the modem 70 and applied to the $CPU_{tc}$ where the modulation characteristic alignment signals (start decode for inserted delay, gain control and spectrum control) are generated. The modulation characteristic alignment may be carried on continually, but preferably is carried on in quiet periods when paging signals are not transmitted.

It will be understood that the multiplexer 72 and the modem 70 are also used when digital page signals are generated. Since these signals are not addressed to the $CPU_{tc}$, they are transmitted as digital page audio FSK to modulate the paging transmitter.

Referring to FIGS. 9 and 9A, the phase detector 54 is illustrated. It will be appreciated that any phase detector which provides a digital output representing a phase measurement may be used. The digital detector includes three D-type flip-flops and a 16-bit binary counter. The counter is reset prior to the times of phase measurement. This reset occurs when the standard signal from the oscillator 48 clocks FF1. Since FF1 can only be reset on alternate clock cycles, an interrupt to $CPU_{tc}$ is generated on alternate cycles of the 2.875 KHz standard frequency. These alternate cycles are also shown in waveform (a) at the Q output of FF1. The $CPU_{tc}$ will reset the counter after a delay to assure that the digital word in the 16-bit counter is transferred to the $CPU_{tc}$. In other words, the counter is cleared by the $CPU_{tc}$ after each reading of the counter. On alternate cycles of the standard frequency, the gate (waveform D) is opened and the counter is enabled to count. The counter counts clock pulses at the 5 MHz rate. When the reference frequency goes high, the Q output of FF2 goes high. This causes FF4 to be set at the next clock pulse after FF2 is set when the Q output (waveform b) goes high. After one clock pulse period, the not-Q output of FF4 goes low, generating a reset pulse which resets FF3 and FF2, closing the gate. The period of the gate determines the phase measurement in terms of the count stored in the counter. As discussed above, prior to the next phase measurement, the counter is cleared by $CPU_{tc}$.

Utilizing the counts stored in the counter, the frequency error signals are generated in the $CPU_{tc}$. These digital frequency error signals are translated by the D/A 50 into signals for controlling the frequency of the standard oscillator. The frequency control signal may be adjusted to provide a programmable frequency offset for the particular carrier input (LO). When frequency offset is not used, as in other applications than paging and phase lock is required, the frequency control signal may be used to lock the phase of the standard to a certain relationship (e.g. in-phase, in-quadrature phase, etc.) with the reference.

Figure 10:
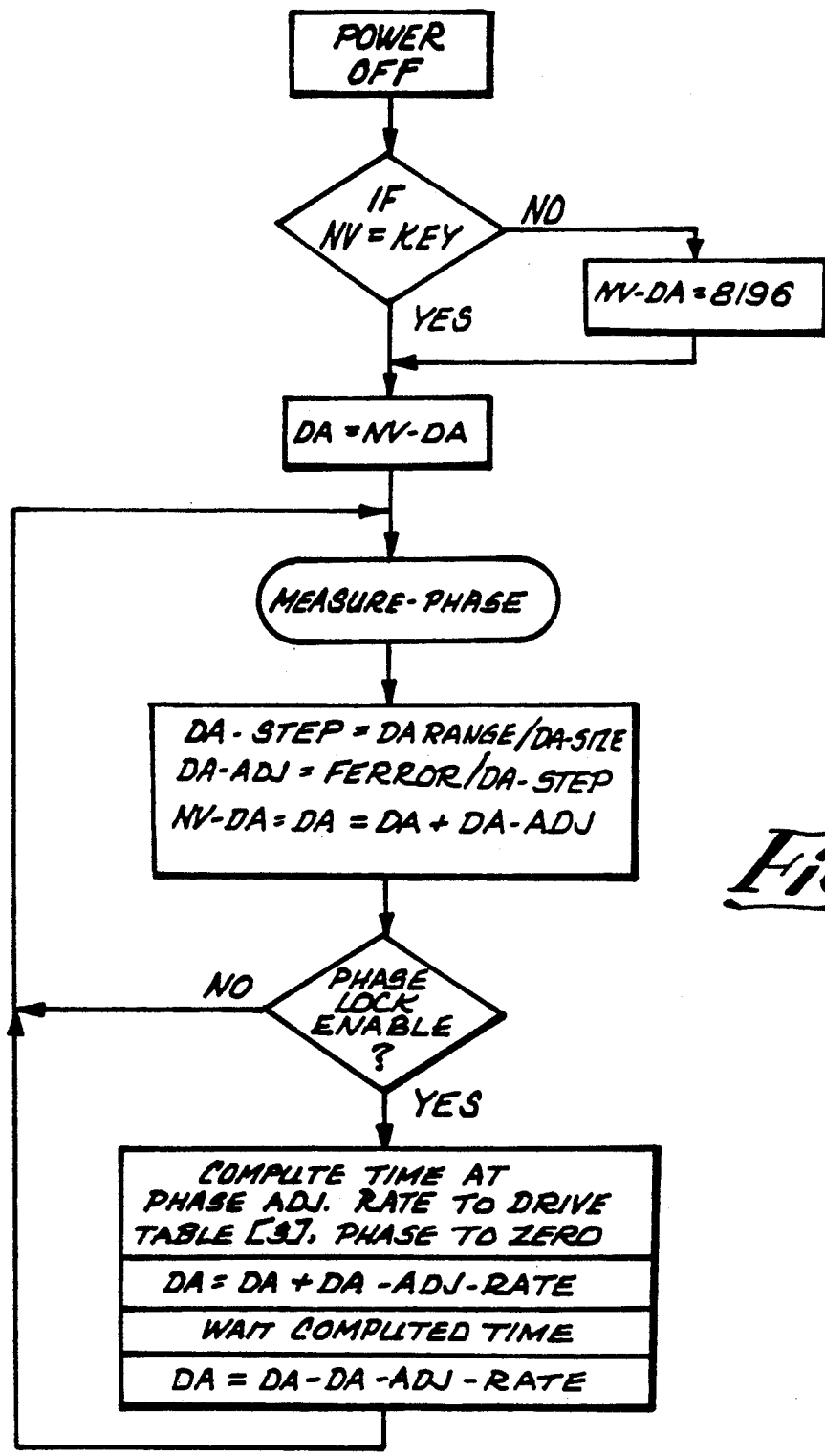

Referring first to FIG. 10, the program for the $CPU_{tc}$ which develops the frequency error (FERROR) control signals will be better understood. On power-up a non-volatile battery back-up memory in the $CPU_{tc}$ is checked by reading a key word therein. The key word is a constant defining a valid non-volatile memory. If the battery back-up is lost, the key word test will default. The non-volatile memory is scrambled and the key word test shows default when the transmitter controller is first placed into service. In the charts, "NV" means non-volatile memory protection key word. If this key word is not read out of the memory, then start-up is assumed and a word is stored in the non-volatile memory called "NV-DA" at the mid-range of the 14-bit D/A which corresponds to 8196 decimal. Thus, either the default number (8196) or the image of the last D/A setting (of the hardware D/A 50) is set into the D/A 50. In other words, the D/A is set to the center of its range or to its last setting. Next, a phase measurement process is carried out.

Phase measurement next occurs. It is a subroutine shown in FIGS. 11A and 11B which will be discussed hereinafter. It basically computes the error using the principles discussed above in the Principles of Operation section of this specification. The measure phase subroutine returns FERROR.

In the next step of the program, FERROR is used to adjust the hardware D/A 50. First, the D/A step is computed as the ratio of D/A-range, which is a constant which defines the total, adjustable range of the D/A 50 in terms of the scalar frequency control (e.g. its total frequency adjustment range which, in the illustrated case, is one part in a million, or $1.0 \times 10^{-6}$). The denominator is D/A size which is the entire D/A resolution range of 14 bits, or $2^{14}$. This indicates how much a bit of the D/A number is worth in terms of frequency change. Then, the D/A-ADJ adjustment necessary is computed which is the number of times D/A step divides into FERROR. This indicates how many steps of D/A are necessary to reduce the frequency error (i.e. the number of unit counts of D/A which must be changed). This number is set into the non-volatile memory and into the D/A as the D/A setting. With this number set, the D/A output voltage is compensating the frequency error.

If phase lock is desired, which is not used when a frequency offset is needed as in most simulcast paging systems, the following computations are made. First, the time required to drive the latest in time (current or table [3]) phase value to zero is computed. In other words, what is computed is the period of time, at a prescribed frequency error rate, to drive the phase counter to a desired relative phase defined to be the phase lock condition. Following the computed period of time, the D/A is set to a number equal to the current value of the D/A setting which is "DA". After the computed time, the D/A setting will be such that the phase of the standard frequency signal will be the same as and locked to the phase of the reference signal. Other phase relationships may be used rather than zero phase difference by inserting the number of counts corresponding to different phase relationships. After phase lock adjustment, the system returns to enable another phase measurement to be made when called for by a calibration enable signal and D/A adjustment for phase locking is repeated for each D/A adjustment as above.

This calibration enable signal may be one of the keying data words which is transmitted from the $CPU_{sc}$ to the $CPU_{tc}$ in the transmitter controllers. The time when a phase measurement is made may be a fixed time, for example every 15 minutes, or a calibration (phase measurement) may occur when the system becomes available, for example, during a quiet period when there is no paging traffic.

Figure 11A:
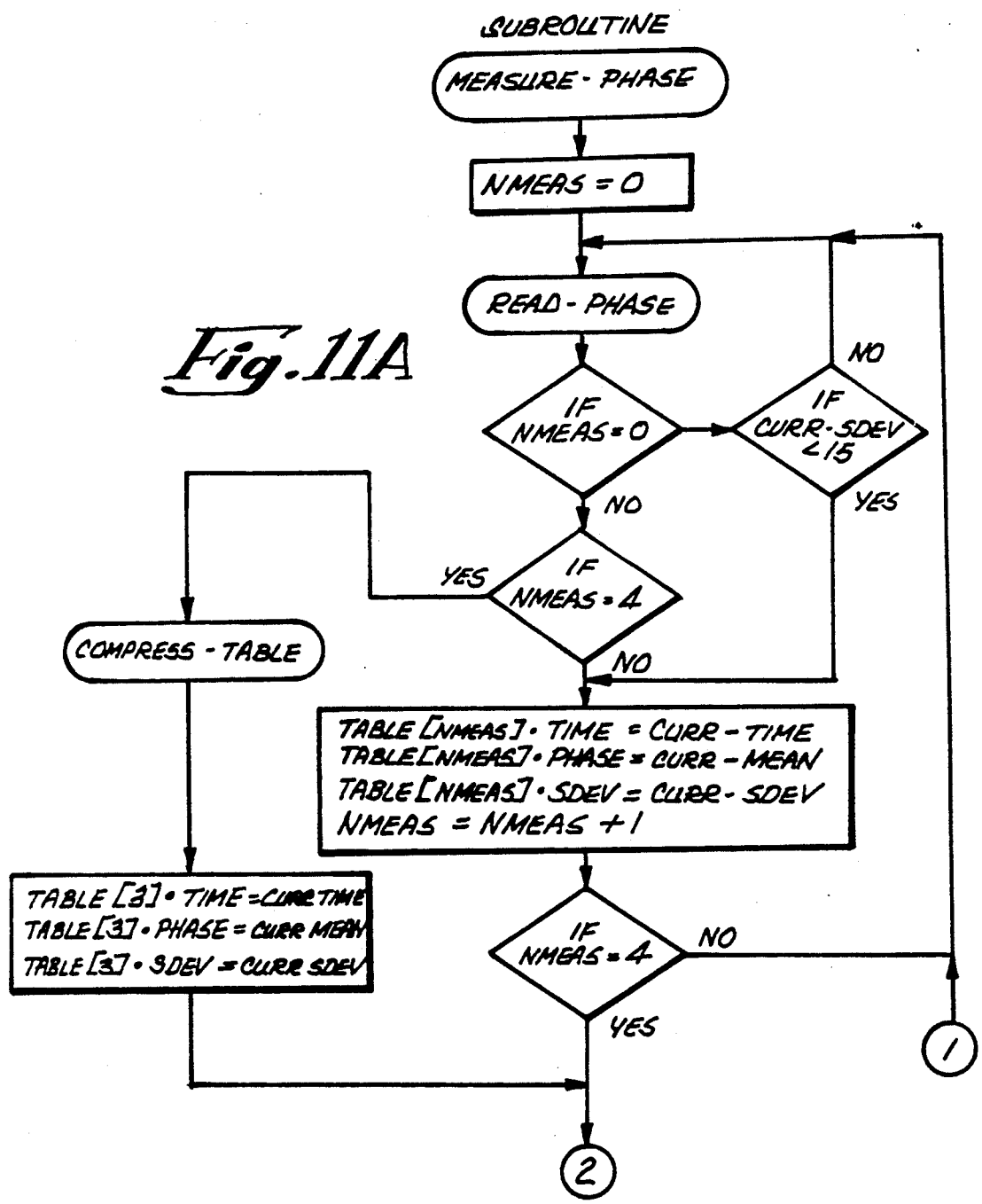
Figure 11B:
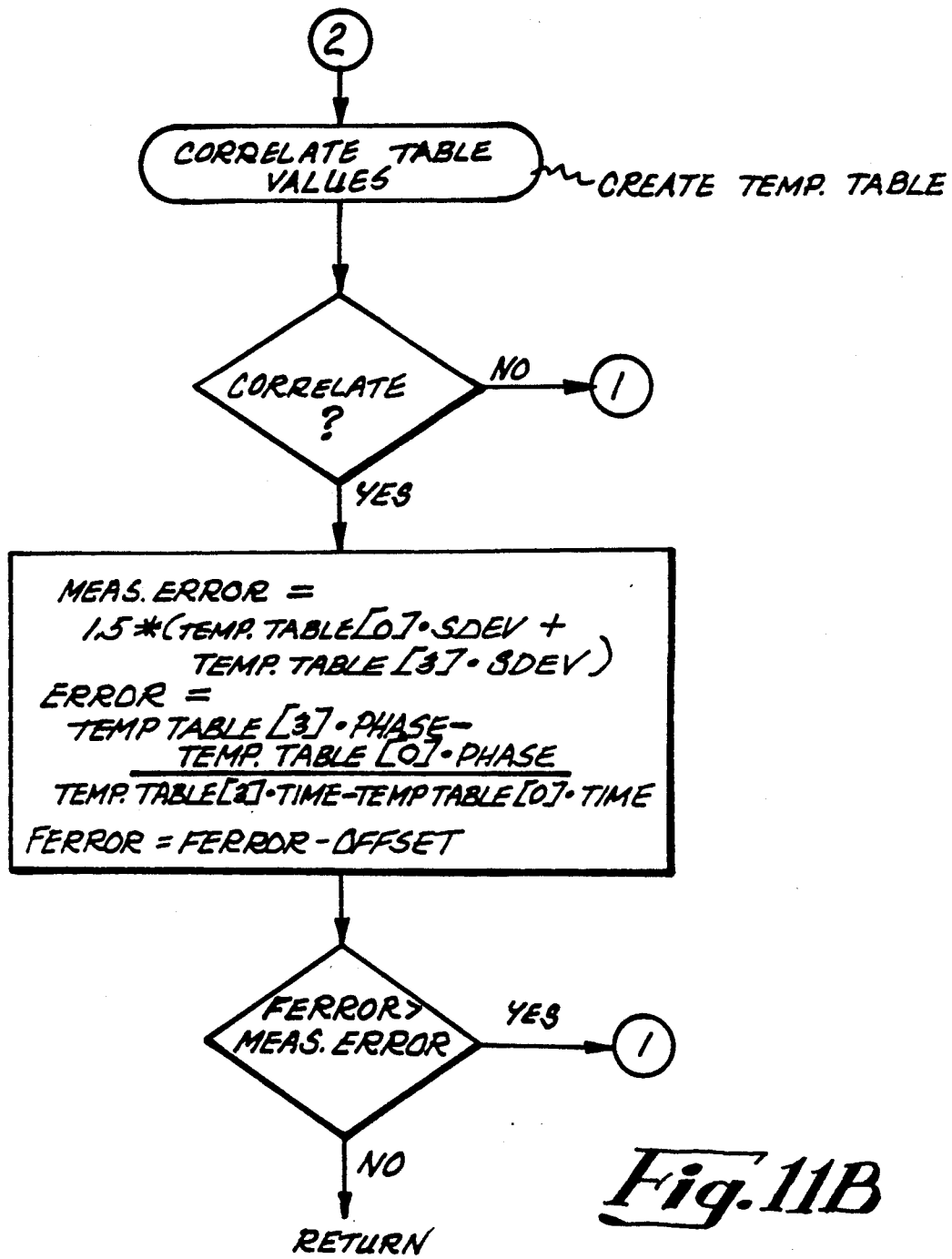

Next, consider the measure phase subroutine which is shown in FIGS. 11A and 11B. In these figures, NMEAS is the number of the measurement. Four measurements are used, an initial measurement, two intermediate measurements and a measurement at the end of the time duration, which duration is used in computing FERROR (the ratio of the difference in phase between the initial and last phase measurement to the duration of time between these measurements). NMEAS is the number of entries in a measurement table where the phase measurements are stored. When NMEAS is zero, the initial phase reading has not yet been made. When NMEAS is zero, the measurement table is empty.

Figure 12:
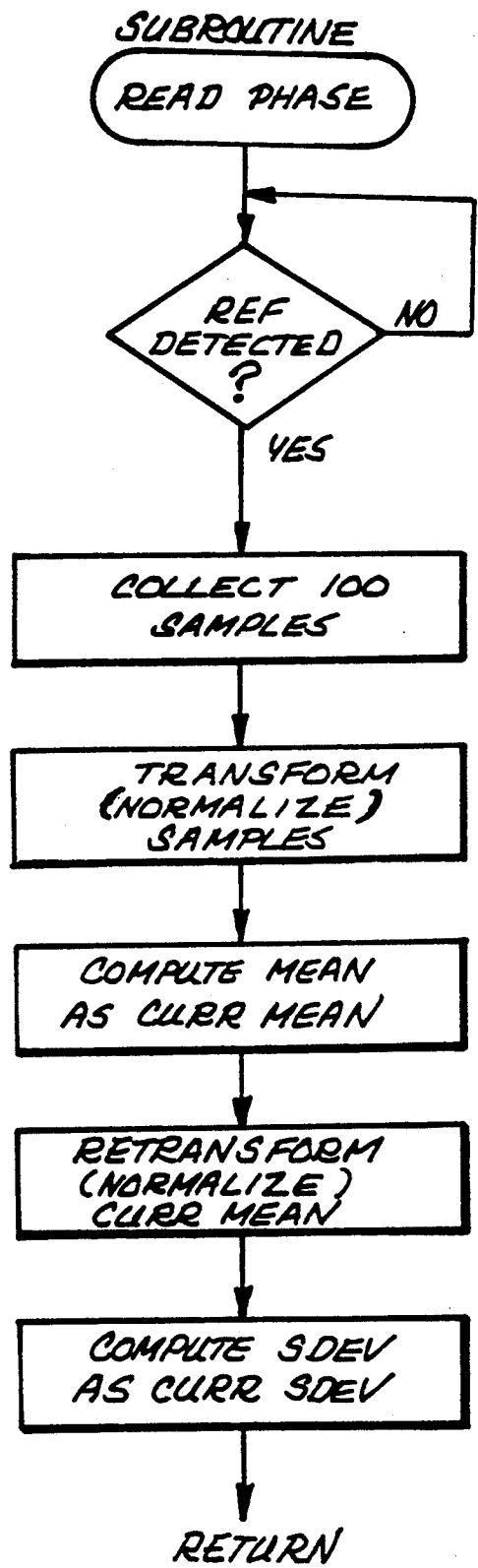
Figure 1:
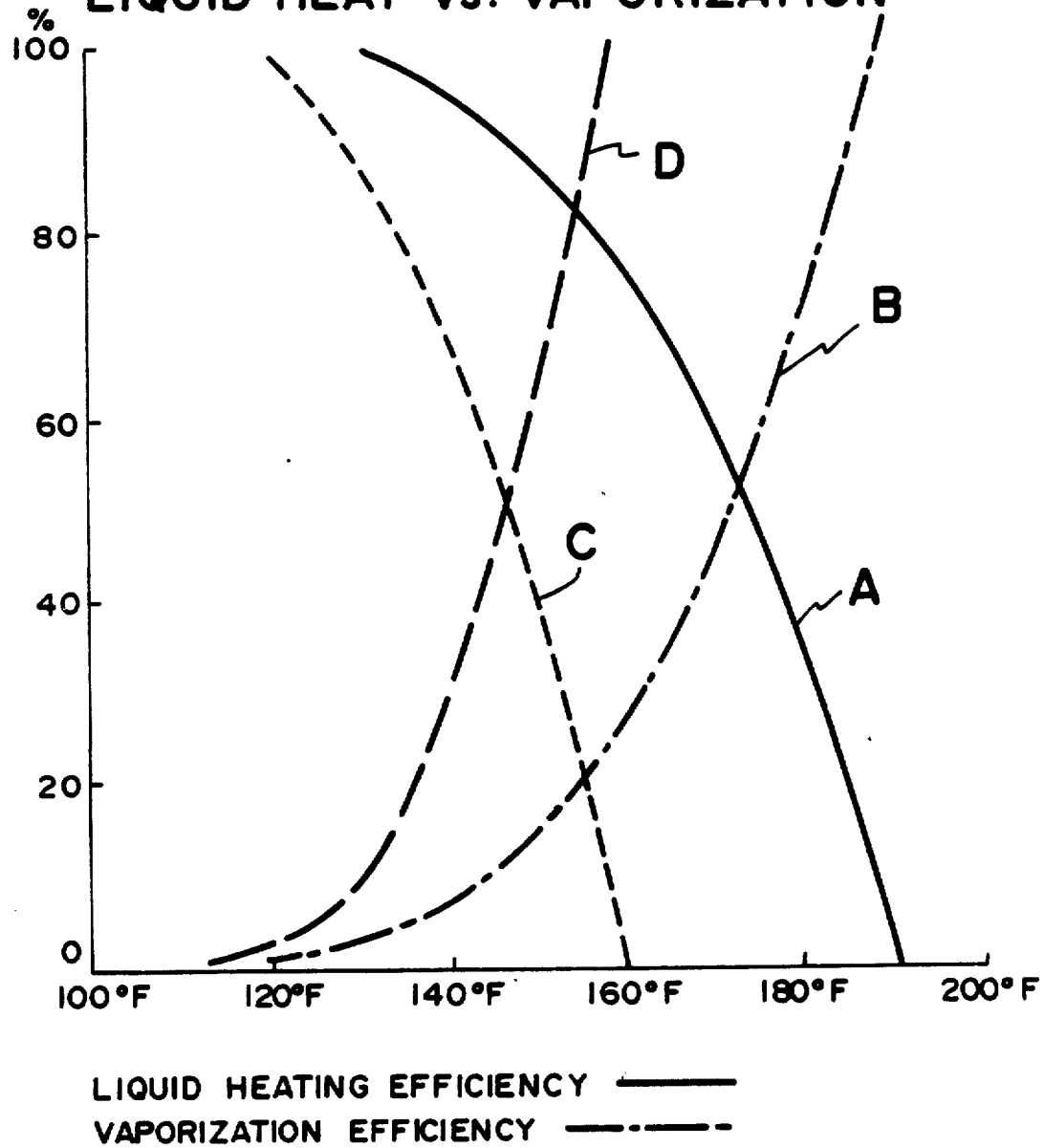
Figure 2:
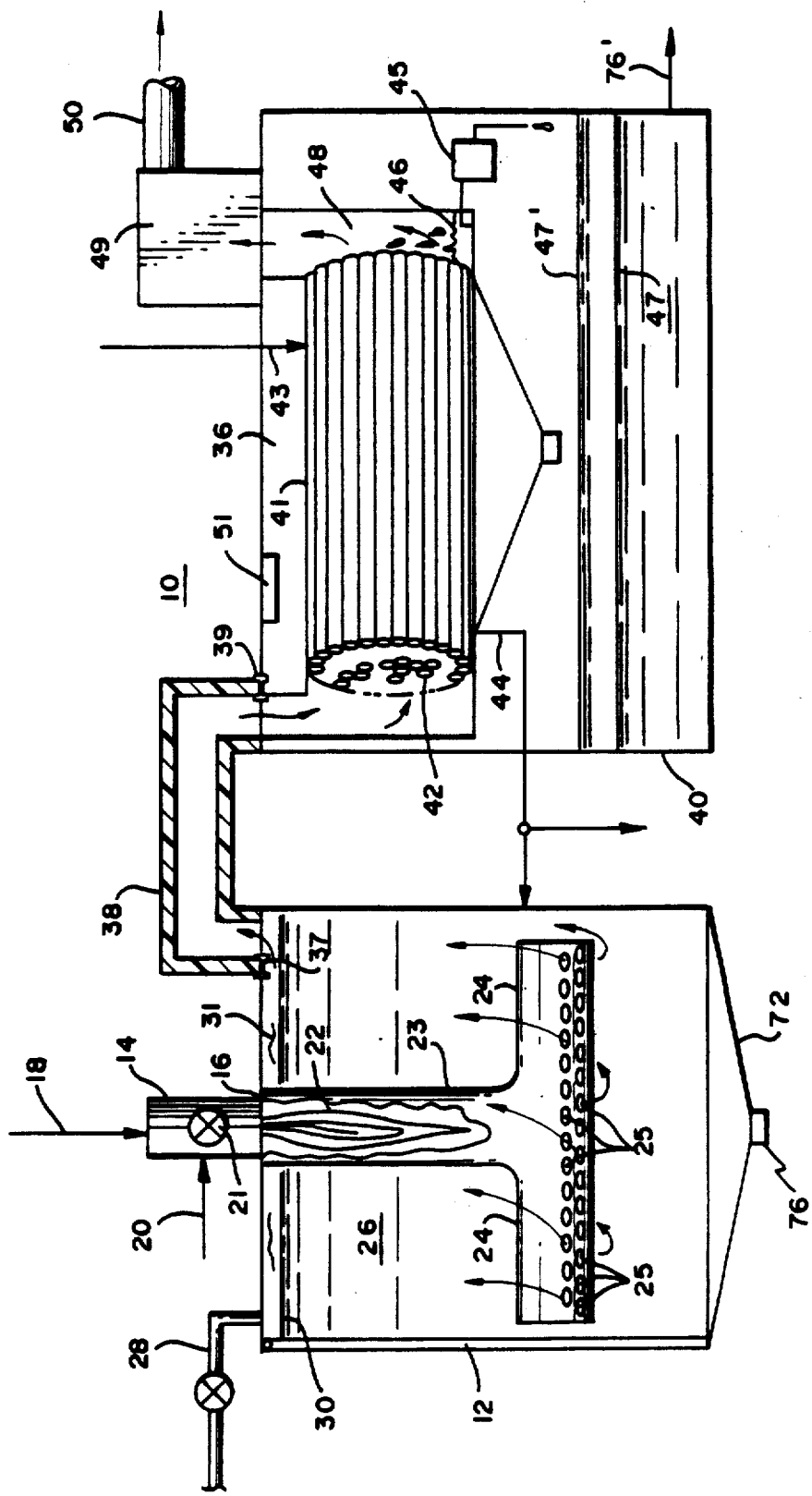
Figure 4:
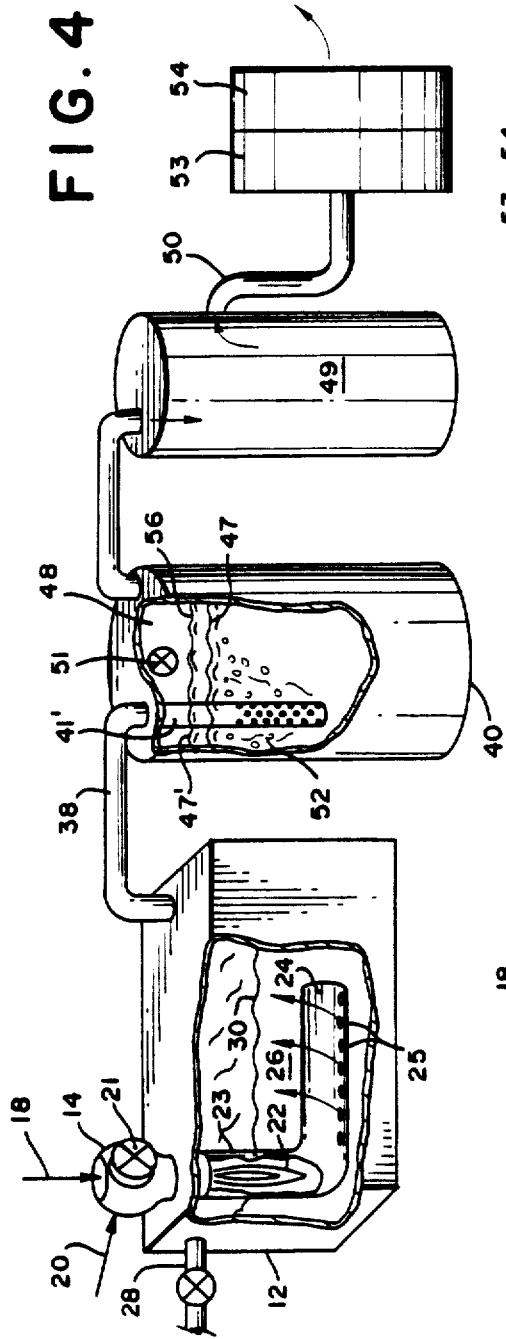
Figure 3:
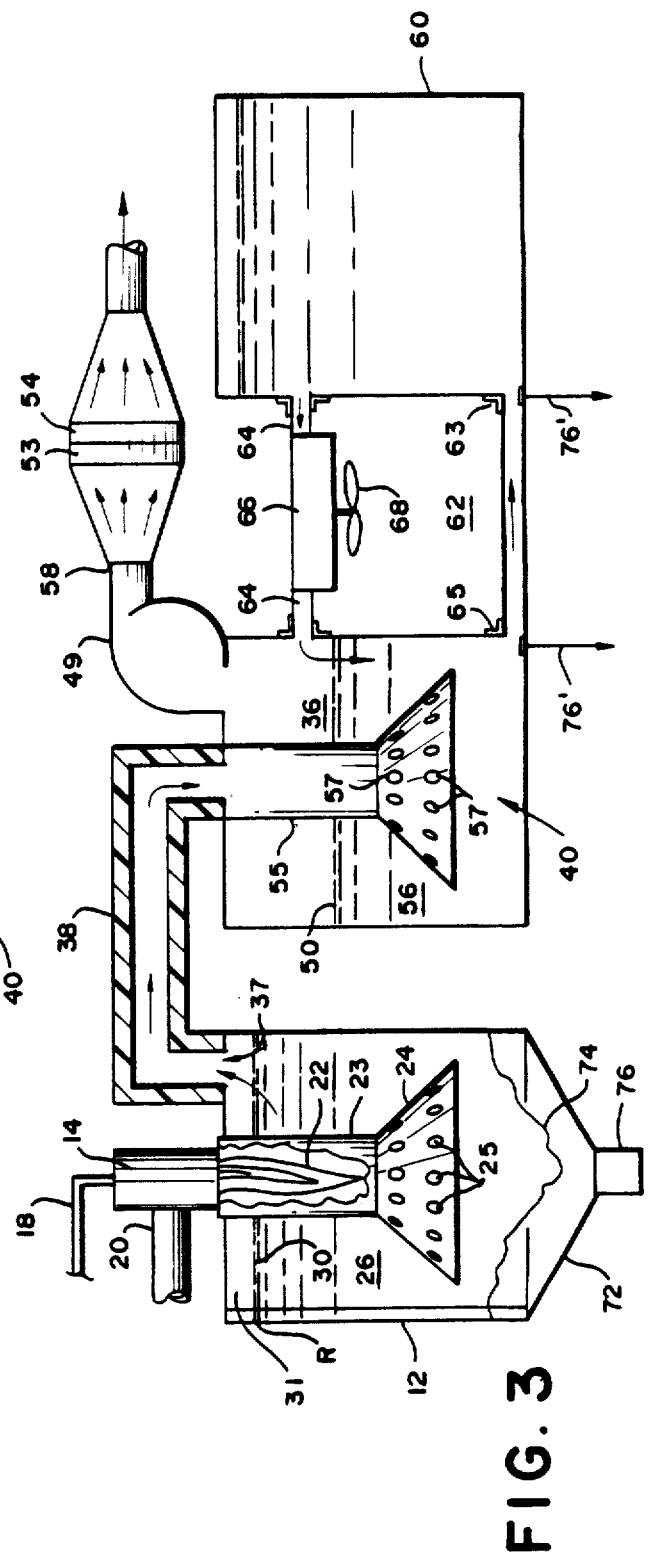

The read phase subroutine is shown in FIG. 12. First, the reference must be detected before the routine is entered. Then, 100 samples are collected at the 1.438 KHz rate. The values of these samples is transformed or normalized to accommodate values of phase which are close to the zero phase condition. This is a phase difference corresponding to approximately one cycle or 347.8 us, the period of 2.875 KHz. This is approximately 1739 counts in the 16-bit counter of the phase detector 54. This is the count that occurs at the wrap point. The transformation or normalization changes these large numbers to negative values. For example, 347.6 microseconds corresponds to a negative number (0–1); 347.4 microseconds, a still larger negative number (1–2), etc. This avoids averaging (taking the mean) of samples that are wrapping. Alternatively, the values at the wrap point may be shifted by 180°. After the transformation, the mean is computed and a value of the mean for the phase measurement is made available. Then, this value is retransformed to accommodate the transformation which is made when the values of the samples are near the wrap point. Using the current mean for this phase measurement, the standard deviation (SDEV) is computed. The conventional formula for standard deviation may be used, i.e. the standard deviation being the square root of the following: the sum of the squares of the variation from the mean of each sample divided by the square of the number of samples minus one.

On the initial reading (NMEAS equals 0), if the standard deviation as measured is greater than 15, that standard reading is disregarded and the initial reading is done at the next calibration time. For example, the samples may be taken when the reference is extremely noisy. It is then desirable to wait until a less noisy reading is made before using it as the initial reading. The initial reading is not changed during the computation of FERROR, and is therefore checked so as to be confident that it is a proper reading.

Then, the table of readings is set up, each with a set of the current time of the reading, the current mean phase value and the current standard deviation for that reading. In terms of the flowcharts, NMEAS is incremented until it equals 4, denoting that the table has four readings. After the four readings are in the table, the table values are correlated, creating another table called "Temp Table". The correlation process adjusts the values for wrap as explained above and the adjusted values of the current phase for each reading is stored in Temp Table. After correlation using the values in Temp Table, the measurement error (MEAS-ERROR) and FERROR are computed. The probability is less than 3% that any sample in the set differs from the mean by more than three standard deviations if the sum of the standard deviations for the initial and last phase measurement (Temp Table [0] and Temp Table [3]). Thus, if the frequency error as computed from the initial and last phase values and the difference in time therebetween is greater than the measurement error as computed by multiplying the sum of the standard deviations for the initial and last reading by 1.5, then the probability that the frequency error is uncertain is very low. Then, the frequency error is returned and the computation of DA-ADJ is carried out as discussed in connection with FIG. 10.

Correlation is carried out using alternating assumptions of positive and negative phase counter-wrapping (i.e. 0 wrap, 1 wrap, −1 wrap, 2 wraps, −2 wraps, etc.) until both positive and negative wrap assumptions yield an indicated frequency error in excess of the maximum frequency error or correlation is achieved. The indicated frequency error is the absolute value of the frequency error defined by the end point entries (the initial and last entry in the table) and the time duration therebetween. Correlation occurs when the intermediate phase measurements lie on the slope of the indicated frequency error plus or minus 1.5 standard deviations for their associated value on the slope. The correlation is successful or it fails.

If correlation is successful, the program continues as shown in FIG. 11B to the calculation of the measurement error and frequency error. If unsuccessful, the table is compressed and the compressed table process is carried out. The new last duration (Table [3]) is derived from reading the phase at the next correlation time. The initial phase reading is never removed. The set of second third or last readings having the shortest time difference between it and the preceeding reading is removed. The times between the first reading and the initial reading, the second reading and the first reading, and the third reading and the second reading are compared. The reading with the smallest time difference is determined and is removed. Thus, either the first, second or third reading is removed if its difference in time to the preceding reading is the smallest. The resulting table is compressed, freeing the fourth position in the table for the new reading. The correlation process is then repeated using the new value for the last reading. The system has monitors which allows only a predetermined number of iterations of the processes before an alarm condition is generated.

From the foregoing description, it will be apparent that there has been provided an improved system for frequency phase and modulation control which is especially useful in simulcast transmission systems. Other applications will be found wherever frequency and phase control is needed, particularly where reference signals are noisy or available only intermittently. The system also permits frequency offsets to be inserted as shown in FIG. 11B by changing the FERROR by an amount to provide the number of cycles (Hz) offset which is required. Variations and modifications in the herein described system, within the scope of the invention, will undoubtedly suggest themselves to those skilled in the art. Accordingly, the foregoing description should be taken as illustrative and not in a limiting sense.

We claim:

1. A system for providing a signal controlled in frequency which comprises means for providing a source of reference signal, means for providing a standard signal, the frequency of which is responsive to a frequency error signal, means for providing measurements of the relative phase difference between said reference and standard signals at a plurality of times spaced in duration from each other, means for selecting said times such that said times are spaced in duration by durations that are at least greater than the period of said standard signal, means for computing a frequency error signal in terms of the ratio of the difference in said phase measurements at at least two of said times to said duration between said two times and means for applying said frequency error signal to said standard signal providing means.

2. The system according to claim 1 further comprising means for varying said frequency error signal until said phase measurement at the end of said duration between said two times reaches a predetermined phase measurement thereby locking said standard source and reference source in phase relationship corresponding to said predetermined phase measurement.

3. The system according to claim 1 further comprising means for selecting said times such that said times are spaced in duration by durations that are at least of the order of minutes.

4. A system for providing a signal controlled in frequency which comprises means for providing a source of reference signal, means for providing a standard signal, the frequency of which is responsive to a frequency error signal, means for providing measurements of the relative phase difference between said reference and standard signals at a plurality of times spaced in duration from each other, means for translating the ratio of the difference in said phase measurements at at least two of said times to said duration between said two times into said frequency error signal, means for applying said frequency error signal to said standard signal providing means, means for making a plurality of said phase measurements over an interval occurring at each of said times, means for deriving from said plurality of measurements over said intervals the means of said phase managements during said intervals and the variances of said measurements from said means, and means for enabling said applying means when said variances are within certain bounds.

5. The system according to claim 4 including means for deriving said bounds from the standard deviations of said variances of said measurements from said mean at said times which are spaced by said duration.

6. The system according to claim 5 wherein the duration of said interval is at least equal to the period of the lowest frequency component of jitter in said phase measurements.

7. The system according to claim 6 wherein said rate is about every 2 cycles of said reference signal and said interval is from about 50 to 100 milliseconds (ms).

8. The system according to claim 4 wherein said bounds is the measurement error of said phase measurements at said times which is equal to a predetermined multiple of the sum of the standard deviations of said variances at said times which are spaced by said duration.

9. The system according to claim 4 wherein said means for making said plurality of phase measurements is operative at a rate which is a multiple of the bandwidth of said reference signal and said interval has a duration where in the integral of noise in said reference signal is non-zero.

10. A system for providing a signal controlled in frequency which comprises means for providing a source of reference signal, means for providing a standard signal, the frequency of which is responsive to a frequency error signal, means for providing measurements of the relative phase difference between said reference and standard signals at a plurality of times spaced in duration from each other, means for translating the ratio of the difference in said phase measurements at at least two of said times to said duration between said two times into said frequency error signal, means for applying said frequency error signal to said standard signal providing means, and wherein said plurality of items is at least 3, one of which is at a time intermediate said duration, and correlation determining means for determining whether the phase measurement at said intermediate time correlates with the phase measurements at the times spaced by said duration.

11. The system according to claim 10 wherein said correlation determining means comprises means responsive to the duration between the phase measurement at said intermediate time along the slope defined by said phase measurements at the time spaced by said duration and the phase measurement at said intermediate time.

12. The system according to claim 11 wherein said phase measurement providing means comprises means for making a multiplicity of said measurements during a predetermined interval at each of said times, means for deriving said phase measurements at each of said times as the mean of said multiplicity of measurements and for deriving a predetermined statistical deviation of said multiplicity of said measurements from said mean as said deviation.

13. The system according to claim 12 wherein said predetermined deviation is the standard deviation.

14. The system according to claim 11 wherein said means for determining whether said phase measurement at said intermediate time correlates, includes means for determining whether said deviation of said intermediate measurement is a predetermined multiple of said predetermined statistical deviation.

15. The system according to claim 14 wherein said phase measurement providing means further comprises means for making another phase measurement later in time than the end of said duration and extending said duration to the time of said later in time measurement when said correlation determining means determines the absence of correlation.

16. The system according to claim 15 wherein said correlation determining means includes means operative upon said another phase measurement and the one of said intermediate measurements and the one of said intermediate measurements and the measurement at the end of said duration which has the lesser time difference between it and its preceding phase measurement for determining correlation.

17. The system according to claim 16 wherein said phase measurement means includes means for providing a pair of said intermediate phase measurements which are spaced in time from each other.

18. A system for providing a signal controlled in frequency which comprises means for providing a source of reference signal, means for providing a standard signal, the frequency of which is responsive to a frequency error signal, means for providing measurements of the relative phase difference between said reference and standard signals at a plurality of times spaced in duration from each other, means for translating the ratio of the difference in said phase measurements at at least two of said times to said duration between said two times into said frequency error signal, means for applying said frequency error signal to said standard signal providing means, and means responsive to said phase measurements for adjusting said measurement at the end of said duration to accommodate one or more wraps in said measurement where said phase difference exceeds one cycle or multiples thereof.

19. The system according to claim 18 wherein said phase wrap accommodating means comprises means for making at least one phase measurement at a time intermediate said duration, correlation means for correlating said phase measurement with the phase along a line having a slope extending between an initial one of said phase measurements at the beginning of said duration and the phase measurement at the end of said duration, and means for increasing and decreasing the phase measurement at the end of said duration until correlation exists or the frequency error exceeds the adjustment range of said standard source.

20. The system according to claim 19 wherein said phase measurement means comprises means for making a multiplicity of said measurements during a predetermined interval at each of said times, means for deriving said phase measurements at each of said times as the mean of said multiplicity of measurements and for deriving a predetermined statistical deviation of said multiplicity of measurements from said mean, said correlation means including means for determining the existence of correlation when said intermediate measurement differs from the phase along said slope at the time of said intermediate measurement by a predetermined multiple of said statistical deviation.

21. The system according to claim 19 wherein said phase adjustment means also includes means for adjusting the phase of said intermediate measurement by a phase difference equal to one or more wraps in phase when it occurs at a time when said slope exceeds a phase difference greater than one cycle.

22. A system for providing a signal controlled in frequency which comprises means for providing a source of reference signal, means for providing a standard signal, the frequency of which is responsive to a frequency error signal, means for providing measurements of the relative phase difference between said reference and standard signals at a plurality of times spaced in duration from each other, means for selecting said times such that said times are spaced in duration by durations that are at least greater than the period of said standard signal, means for translating the ratio of the difference in said phase measurements at at least two of said times to said duration between said two times into said frequency error signal, means for applying said frequency error signal to said standard signal providing means, and means for changing said frequency error signal by an amount corresponding to a predetermined frequency offset thereby locking said standard signal to a frequency which differs from the frequency of said reference source by said offset.

23. The method of deriving a measurement of the frequency error between a standard signal and a reference which may be corrupted by noise and other error signals, which method comprises the steps of collecting a multiplicity of sample phase measurements of the phase difference between said reference and standard signal at a predetermined rate during an initial interval of predetermined duration and at a plurality of other intervals each occurring later in time, generating a table for each of said measurements containing its mean value, its statistical deviation and the time of its occurrence, adjusting the mean phase values in the table except for the mean phase value for the initial interval until the values lie within a predetermined multiple of their standard deviation from a line between the last and initial ones of said mean phase values which line represents an indicated frequency error thereby indicating a correlation condition, outputting said indicated frequency error as said frequency error when said indicated frequency error is less than a predetermined multiple of the sum of the standard deviations of the initial and last of said standard deviation values in said table.

24. The method according to claim 23 further comprising the step of removing said table values for the one of said measurements which is closest in time to a phase measurement which proceeds it when said correlation condition is not achieved notwithstanding adjustment of said mean phase values except for said initial mean phase value by a predetermined number of wraps (corresponding to phase differences equal to a cycle or 360° of phase difference) which exceeds the adjustment range of said standard signal, then replacing the last phase value in said table with a mean phase value for a multiplicity of phase measurements occurring at an interval later in time than the last occurring of said intervals.

25. The method according to claim 23 further comprising the step of storing values in said table as the values for said initial interval only if the standard deviation thereof is less than a predetermined standard deviation thereby excluding measurements using said reference signal when it is badly corrupted to provide values for said initial interval in said table.

26. A communication system for matching signals transmitted simultaneously by a plurality of transmitters in their modulation characteristics which comprises a station for generating said signals, said station having system controller means for generating calibration signals, a plurality of transmitter controller means each connected to a different one of said transmitters, each of said transmitter controller means having means for controlling the modulation characteristics transmitted therethrough, means for transmitting said calibration signals at different times to different ones of said transmitters, means at said station for receiving said calibration signals from said transmitters, said system controller having means for correlating said calibration signals received from said transmitters with each other and for transmitting digital control signals to each of said transmitters representing differences in said modulation characteristics therebetween, and means in said transmitter controller means responsive to said digital control signals for operating said modulation characteristic controlling means to match said modulation characteristics of said transmitters.

27. The system according to claim 26 wherein said modulation characteristics are selected from the group consisting of delay, gain and spectral content, and said modulation characteristic control means includes circuit means in the path of signals for modulating said transmitters selected from the group consisting of delay insertion means, gain control means and filter means.

28. The system according to claim 26 wherein said transmitters are controlled in carrier frequency of the signals which are modulated therein, said system controller means including means for transmitting a reference signal at a frequency in the voice band to said transmitters, and means in said transmitter controller including a carrier frequency source responsive intermittently to said control signals for deriving measurements of the frequency error between said reference signal and a signal coherent with said carrier frequency for controlling the frequency of said carrier frequency source.

29. A system for providing a signal controlled in frequency which comprises means for providing a source of reference signal, means for providing a standard signal, the frequency of which is responsive to a frequency error signal, means for providing measurements of the relative phase difference between said reference and standard signals at a plurality of times spaced in duration from each other, means for selecting said times such that said times are spaced in duration by durations that are at least greater than the period of said standard signal, means for translating the ratio of the difference in said phase measurements at at least two of said times to said duration between said two times into said frequency error signal, means for applying said frequency error signal to said standard signal providing means, and means for selecting said times so that a plurality of said durations are unequal from each other and are not integral multiples.

30. A system for providing a signal controlled in frequency which comprises means for providing a source of reference signal, means for providing a standard signal, the frequency of which is responsive to a frequency error signal, means for providing measurements of the relative phase difference between said reference and standard signals at a plurality of times spaced in duration from each other, means for selecting said times such that said times are spaced in duration by durations that are at least greater than the period of said standard signal, means for translating the ratio of the difference in said phase measurements at at least two of said times to said duration between said two times into said frequency error signal, means for applying said frequency error signal to said standard signal providing means, and said means for providing a source of reference signal including means operative to provide said reference signal intermittently at times spaced in duration from each other corresponding to the times when said measurements are made.

31. In a communications system wherein information signals are transmitted over a certain bandwidth from a station for retransmission by transmitters remote from said station and each of which has an oscillator, a control system for controlling said oscillators of said transmitters which comprises means for transmitting reference signals in said bandwidth from said station to said transmitters at a plurality of times the interval between which is varied, means for selecting said times such that said times are spaced in duration by durations that are at least greater than the period of said reference signal, transmitter controlling means in each of said transmitters having means for providing measurements of the phase differences between said reference signals and signals from the oscillator thereof at each of said times, means for providing outputs corresponding to the slope of said phase measurements to provide frequency error signals, and means for providing said error signals to said oscillator.

32. The control system according to claim 31 further comprising means for making a plurality of said phase measurements over an interval occurring at each of said times, means for deriving from said plurality of measurements over said intervals, the means of said measurements during said intervals and the variances of said measurements from said means, and means for enabling said applying means when said variances are within certain bounds.

33. The system according to claim 32 wherein said variances are represented by the standard deviation of said measurements.

34. The control system according to claim 31 further comprising means responsive to the duration between successive ones of said phase measurements for determining the correlation therebetween.

35. In a communication system having a plurality of transmitters for transmitting signals simultaneously, said system having a station for generating said signals and also for generating control signals, apparatus for controlling the modulation characteristics of said signals, which said transmitters are transmitting comprising transmitter controllers in each of said transmitters, means for operating said transmitter controllers with said control signals, CODECS in said transmitter controllers for applying said signals which said transmitters are transmitting to said transmitters, said CODECS having means for converting said signals into PCM signals and back from PCM signals into said signals which said transmitters are transmitting, and means in said transmitter controllers for addressing said CODECS to interpose selective delay on said signals being applied to said transmitters.

36. The apparatus according to claim 35 wherein said addressing means is a CPU, and means for inputting data corresponding to said control signals to said CPU.

* * * * *

UNITED STATES PATENT AND TRADEMARK OFFICE
CERTIFICATE OF CORRECTION

PATENT NO. : 5,032,230

DATED : July 16, 1991

INVENTOR(S) : Richard C. Shepherd

It is certified that error appears in the above-identified patent and that said Letters Patent is hereby corrected as shown below:

The 10 Drawing Sheets and columns 1-20, should be deleted and substitute the attached 3 Drawing Sheets and columns 1-12 therefor.

Signed and Sealed this

Seventh Day of April, 1992

Attest:

HARRY F. MANBECK, JR.

Attesting Officer

Commissioner of Patents and Trademarks

VACUUM DRAFT SUBMERGED COMBUSTION SEPARATION SYSTEM

FIELD OF THE INVENTION

This invention relates to a vacuum draft submerged combustion system and more particularly to a vacuum draft submerged combustion system having greater efficiency than heretofore known submerged combustion systems and which is readily adaptable for use in a variety of industrial processes where it may be desirable to remove dissolved solids from liquids.

DESCRIPTION OF THE PRIOR ART

Toxic waste and the separation of impurities from contaminated liquids is a major problem in most industrialized countries. Groundwater is easily contaminated by hydrocarbons and chlorinated solvents. Other sources of contamination include leaking tanks, accidental spills, dumping of solvents and even natural rainfall which is a major carrier of pollutants discharged as vapor into the atmosphere.

Recent emphasis by environmentalists has created a public awareness and concern in pollution problems and the attendant dangers therefrom confronting industrialized nations. Throughout the world, the resources of governments have been polarized to attack these problems. Legislation in many countries has made dumping of waste illegal. Pollutant controls have been required with respect to discharge of industrial waste in both liquid and gas form. Because of the tremendous efforts and attention being paid to waste disposal and toxic waste management controls, a need exists for reliable, cost efficient systems for removing impurities form water.

Various systems have been devised in the past for handling toxic waste and removing impurities from water. Typical of such systems are the methods of desalinization illustrated and described in U.S. Pat. No. 3,933,600; the process for reconditioning spent brine for recycling illustrated and described in U.S. Pat. No. 3,732,911 and the system and method for removing dissolved organic impurities from groundwater illustrated and described in U.S. Pat. No. 4,713,089.

The latter patents identify many problems confronting industry, but none is perhaps more important than that recognized in the '911 patent. As stated therein at column 2, lines 3–9, "Because of the present emphasis by federal State, and local government on pollution control, processors who rely on the procedure in question (discharge of waste onto a ground site) are facing a crisis-they must devise a disposal system which not only meets anti-pollution standards, but also does the job economically. A failure to meet these criteria means that the operation must be shut down".

A review of the aforementioned patents shows three different approaches to deal with three specific problems. Each of these approaches has a common drawback. They each require a high level of energy input for treating liquid, and thus are designed each in their own way to minimize energy consumption. In the '911 patent a submerged combustion unit evaporator is used for a brine solution with vapors being passed to a scrubber while liquids slurry concentrate is passed to an incinerator which is heated internally to temperatures between 1000° F. and 1400° F. In the desalinization process of the '600 patent, the intake water is preheated in preheating stages to a temperature preferably above 130° F. before being processed in the form of a spray onto a flat flame to cause partial vaporization.

In the '089 patent, a stripper column is used wherein steam generated in a boiler is passed counter current to the contaminated water being treated, the scrubber being operated at a reduced pressure so that the feed water enters the column at its boiling point. The vapor exiting from the scrubber is compressed to reduce its condensation temperature, passed through a boiler where it is condensed and the condensed and noncondensed phase; passed into a receiver where they are separated.

All of the above identified systems and methods require substantial amounts of energy input into their systems for their operation. The substantial energy input required in such systems contributes to a significant portion of the operating expense for operation of the systems, and contributes to their inefficient operation. It is noted that the operating expense of such systems will increase with higher fuel prices and be subject to shortage of fuel. Moreover, as recognized, the separation of constituent impurities from a solution requires their safe disposal without harming the environment.

Submerged combustion systems such as disclosed in the '911 patent have been recognized as an efficient method of distillation because the partial pressure of the water vapor in the rising bubbles is less than the atmosphere so that boiling takes place at a temperatures below 212° F. Previous use of submerged combustion in distillation systems has required that the back pressure of the displaced water from the combustion chamber be overcome with the use of a blower operating with positive pressure. This approach suffers from several disadvantages. For example, gasketing at the burner is critical to prevent escape of very hot gases from the combustion chamber. Also, heavy construction of the combustion chamber is necessary and high and low air pressure instrumentation as well as emergency gas escape valves are needed. Other problems arise in the use of positive pressure. For example, the effect of the partial pressure of the rising vapor bubbles is reduced as in the size of the bubbles which in turn reduces the heat transfer rate from bubble surface to liquid. As a result, more time is required, restricting the introduction of the flame to the lowest levels. This in turn may require elevated fuel pressures for heat transfer.

SUMMARY OF THE INVENTION

These and other disadvantages of conventional submerged combustion systems are overcome by the present invention which provides a unique and novel submerged combustion system which operates with a vacuum throughout the system. In this manner the fuel and air are drawn into and through the combustion chamber where combustion takes place and the hot gases are drawn into and passed through the liquid or solution while condensed gases are drawn into a second condensing stage and through the vacuum pump. By operating the submerged combustion burner under vacuum, the relative bubble size of the bubbles passing through solution is increased over that which would be available under atmospheric or pressurized conditions, thus increasing the available surface area for heat transfer. This in turn increases the heat transfer rate which improves efficiency and provides several advantages over the prior arrangements.

Accordingly, a primary object of the present invention is to provide a vacuum draft submerged combustion system which provides for efficient and easy separation of constituent portions of a solution.

Another object of the present invention is to allow for separation and disposal of various constituent components of solutions safely and efficiently in the environment or at remote waste disposal sites.

Another object of the present invention is to provide a means for purifying contaminated liquids or solutions having unwanted dissolved solids.

Another object and distinct feature of the present invention is to provide a system for and a method of separating undesirable dissolved components of a solution.

A further feature and distinct advantage of the present invention is the ability to utilize a vacuum draft submerged combustion system for effective removal of components from a solution which requires a separation of the constituent portions of the solution.

The following is a list of some of the advantages of the present invention over conventional systems:

Liquids and solutions introduced into the negative pressure of the vacuum draft system have substantially lower boiling points.

The system of the present invention offers an increased heat transfer rate from bubble surface to the bath because the vacuum allows the bubbles to expand and thereby provide more surface area for heat transfer.

Gases may be introduced at a shallower point in the water as a result of the more rapid heat transfer and less residence time necessary for the bubbles to pass through solution.

Gasketing around the combustion chamber is minimized.

The need for heavy construction metals or exotic metals in the combustion chamber are minimized.

Fuel pressures can be reduced.

The vacuum draft submerged combustion system of the present invention is much safer than positive pressure systems because any leaks of the hot gases in the combustion chamber or tanks(s) will be directed inward instead of outward.

Back pressure on the combustion process is eliminated.

Fuel is conserved due to the lower boiling points achieved.

SOME OF THE OBJECTIVES ACHIEVED BY THE PRESENT INVENTION INCLUDE

Purifying liquids or solutions which have unwanted dissolved solids such as salt, and condensing the steam back, or other undesirable components with different boiling points which may be subject to distillation with this process.

The ability to utilize a vacuum system for the more efficient distillation and removal of components from a solution which requires a separation of the constituent portions of that solution.

Blending or mixing of various solutions at differing temperatures.

The capacity to homogenize into jell form solutions of seemingly immiscible materials such as water and oil, for such uses as lubricants and blending solutions for cosmetic purposes.

Vacuum distillation of a solution providing for more efficient and easier separation of constituent portion of the solution.

Steam Vapor Generation for use as a steamer or a humidifier.

Hydronic heating system for uses such as heating homes, swimming pools or industrial heater.

Distillation of whiskey.

Distillation processes and treatment of waste streams in general such as toxic dissolved solids in water or raw sewerage.

The capacity for use as a laundering system or for dyeing or bleaching textiles.

Used to separate oil and water or briny water with the use of de-emulsification chemicals such as one manufactured by Emulsions Control, Inc. 829 Hooven Avenue, National City, Calif. the brand name E.C.I. to produce the light ends hydrocarbons on the surface of water after being condensed.

In accordance with the present invention, in one embodiment thereof, a high intensity flame is used to heat gases directed into a solution maintained in a tank which is under partial vacuum. Due to direct contact with the hot gases entering the solution which are ar a temperature in the order of 1200° F., the solution is rapidly raised to and stabilized at about 160° F. with the hot gas bubbles flowing upwardly through the solution causing evaporation. Due to the vacuum, the volume of the bubbles tends to expand over that of a pressurized system giving an increased surface area of contact and improved heat transfer and efficiency. The gas bubbles containing undesirable constituents of the liquid are drawn upward and outward to a condenser where the unwanted constituents are collected by condensation of the gases, the uncondensed portions of the vapor phase being vented to atmosphere after preferably passing through a filter.

The vacuum draft submerged combustion system of the present invention provides an improved and efficient method of separating components portions of a solution. A partial vacuum is maintained in a vaporizing and condensing tank connected to each other to reduce the boiling point of the liquid and to increase the volume of the hot gas bubbles introduced drawn through the solution the bubbles containing the vaporized components of the solution are passed into the condenser which may be either a shell and tube or plate and frame form. Alternatively, the heat exchanger or condenser may be of the submerged system type. In that event, the gases are introduced into a tank below the level of a relatively cool condensing liquid to bubble the components through the cool liquid which condenses the volatile components. Any uncondensed components may be vented to the atmosphere with or without filtering and the condensate is recovered for possible or waste disposal as the case may be.

BRIEF DESCRIPTION OF THE PREFERRED EMBODIMENTS DRAWINGS

Further objects of the invention and a better understanding thereof will be obtained from the following drawings and accompanying description. In the drawings, like parts throughout the several views are represented with like reference characters.

Figure 2:
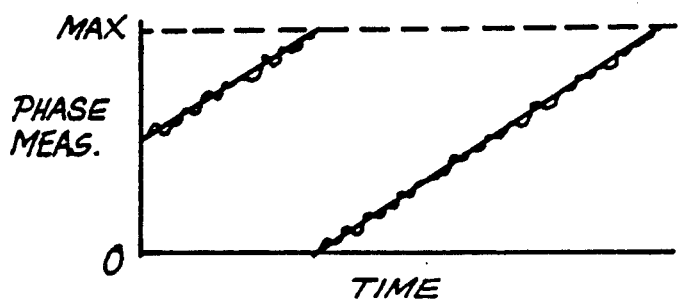
FIG. 2 is a graph similar to FIG. 1 where noise is present.
Figure 3:
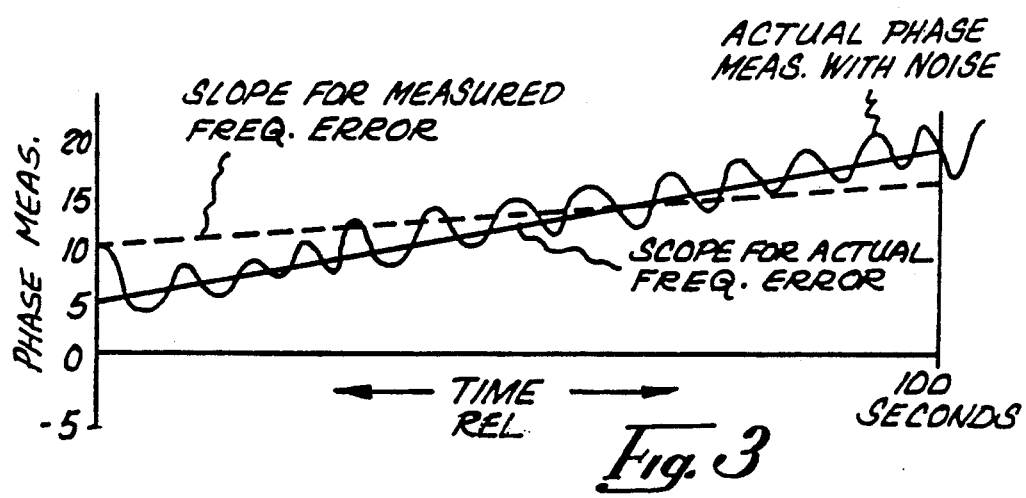
FIG. 3 is a graph showing relative phase verses time for given frequency error where noise is present and which illustrates how noise perturbs the frequency error measurement.
Figure 4:
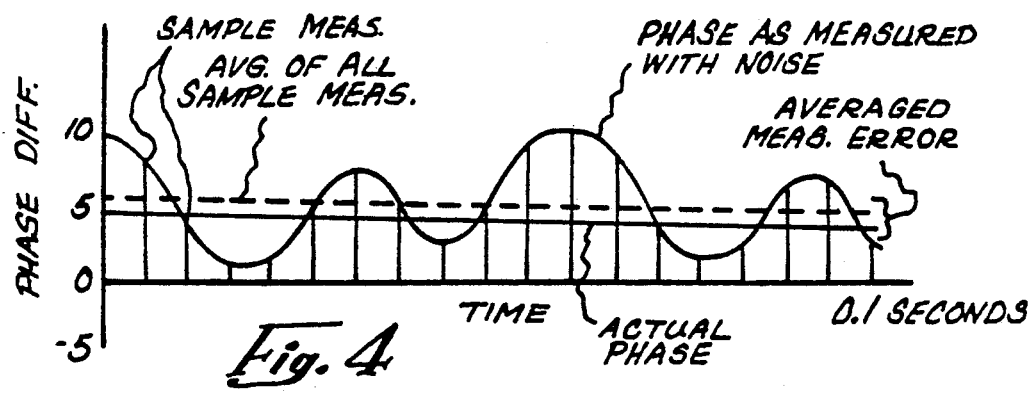
FIG. 4 is a graph similar to FIG. 3 but on an expanded scale.
Figure 5A:
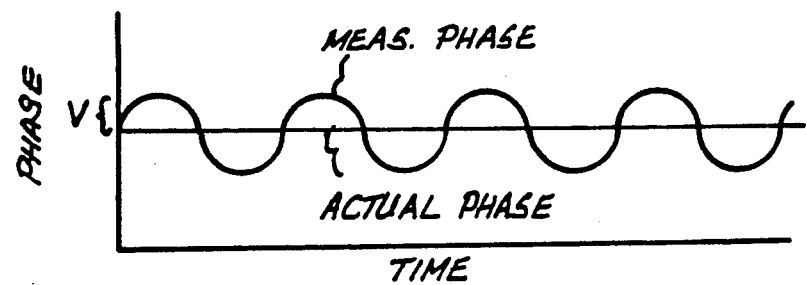
FIGS. 5A and 5B are graphs idealized to show variations in phase and in mean phase difference or error over a plurality of cycles of phase difference so as to show the effect of varying the measurement interval during high samples of phase are taken.
Figure 5B:
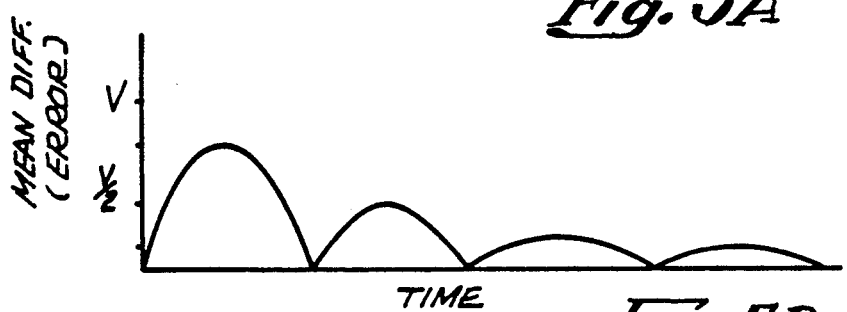
Figure 6:
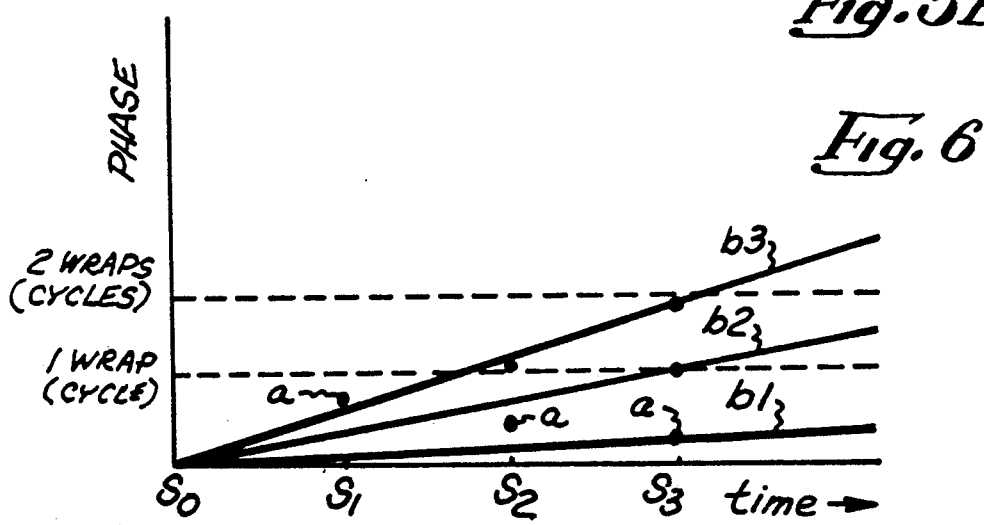
FIG. 6 is a graph illustrating the effect of phase wraps on the phase, measurements and showing the adjustment thereof by correlation with the slopes of lines without wrap with one and two cycles of wrap.

FIG. 1 is graphical representation contrasting heating efficiency of a liquid vs. efficiency for submerged combustion systems with and without vacuum draft;

FIG. 2 is a diagrammatic representation of the present invention employing a shell in tube type condensing heat exchanger;

FIG. 3 is a diagrammatic view of the representation of the present invention employing a submerged combustion condenser; and FIG. 4 illustrates in diagrammatic form of another embodiment of a submerged system according to the present invention.

DESCRIPTION OF THE INVENTION

Before describing the invention in the preferred embodiments, reference should be made to FIG. 1 which graphically depicts the advantages achieved by comparing the heating efficiency of and vaporization efficiency of a vacuum draft submerged combustion system with that of a conventional submerged combustion system. The graphs represent measurements taken in a 100 gallon tank using a 100,000 B.T.U.H. burner having a 6 inch diameter by 30 inch long combustion chamber connected to a six inch diameter, 36 inch long bubble distributor shown more clearly in FIG. 2. The combustion chamber and distributor were submerged in tank with the distributor arranged cross wise of the chamber which was positioned vertically. For vacuum operation, a lid was provided on the tank and sealed. A pipe was installed opposite the combustion chamber and connected to a vacuum pump to draw a vacuum of approximately 4 inches Hg with the flame ignited.

The x axis of FIG. 1 represents the temperature of the liquid and they y axis represents efficiency in percent. With stoichiometric gas/air ratios, the maximum temperatures attainable in the submerged combustion system at atmospheric pressure is approximately 195° F. This is represented by solid line A and is believed due to the great affinity and capacity of moisture which the spent combustion gases have at the higher temperatures and the natural partial pressure of the water vapor in the rising bubbles. Thus, at 195° F., substantially all of the heat goes into vaporizing or steaming and the heating efficiency (Line A) of the water is zero. Conversely, steaming off or evaporation at 195° F. under atmospheric pressure is 100%. This is represented by Line B comprising long and short dashes.

When operating the tank under a vacuum of approximately 4 inches Hg the surprising and unexpected result of a maximum solution temperatures of 160° F. is observed. This is represented by Line C comprising short dashes. Line D comprising large dashes shows the evaporation efficiency which reaches 100% at approximately 160° F., the maximum temperature attainable at 4 inches Hg. While the reason and the effects of the combined vacuum draft and submerged combustion are not entirely understood, it is believed that the result are attributable to the larger volume of air bubbles which are obtainable under vacuum. To this end, the percent volume expansion (based on volume of one cubic foot of dry air) ratio of a gas force draft system and a vacuum draft system can be shown to be:

| | FORCED DRAFT SYSTEM | | |
|---|---|---|---|
| | 1 psi | 2 psi | 3 psi |
| @ 60° F. | 1.00 | 1.00 | 1.00 |
| @ 160° F. | 1.19 | 1.19 | 1.19 |
| @ 1200° F. | 2.99 | 2.81 | 2.65 |
| | VACUUM DRAFT SYSTEM | | |
| | 2 Hg | 4 Hg | 6 Hg |
| @ 60° F. | 1.00 | 1.00 | 1.00 |
| @ 160° F. | 1.28 | 1.38 | 1.49 |
| @ 1200° F. | 3.42 | 3.68 | 3.99 |

The latter Computations show that at 60° F. there is no substantial expansion of bubble size up to 6 inches of vacuum, but that there should be a dramatic 50% increase in bubble size with 6 inches of vacuum at 1200° F. Inasmuch as the rate of the heat transfer is dependent on the area of surface contact of the bubble with the solution, the larger bubbles serve to increase the rate of heat transfer and thus improve the efficiency of the system.

With reference to FIG. 1, it can be seen that with a maximum temperature of 160° F. and a heat input of 100,000 BTUH, the bath or solution has an evaporation rate of approximately 100 lbs./hr. With an input of 1,000,000 BTUH, distillation rate of 1000 lbs. of water per hour may be reached. With a forced draft system, the BTUH requirement of 195° F. would be 35 times that, i.e. 350,000 BTUH heat input would be necessary to evaporate 100 lbs. of water/hr. The vacuum draft submerged combustion system according to the invention provides approximately a 30% increase in performance over a forced draft system. While further testing and evaluation need to be done to determine the effects of air in the combustion process as used in the vacuum draft system of the invention and the effect on rate of temperature rise and maximum temperatures attainable at different vacuums, there seems little doubt that the vacuum draft submerged combustion process synergistically effects the efficiency of the system and dramatically reduces the cost of distillation of water on terms of BTUH per pound so as to provide significant cost savings not heretofore attainable with forced draft systems.

FIG. 2 shows in diagrammatic form the essential elements of an embodiment of the present invention. The system of the embodiment shown in FIG. 2 is generally indicated by reference character 10 and includes a first tank 12 enclosed and substantially sealed to the environment and having a burner 14 disposed through an aperture 16 in the top of the tank 12 and supported in a known manner internally of the tank 12. Burner 14 includes conventional fuel inlet and air inlets 18, 20 respectively, suitably valved as at 21 for providing a proper fuel and combustion air mixture, to the burner 14. The mixture when ignited provides a direct flame 22 into a combustion chamber 23 disposed below the level 30 of the solution to be treated. Level 30 may be maintained by suitable float controls arranged to automatically control the liquid input so that a substantially constant level is maintained with a space maintained between the top of tank 12 and level 30. First tank 12 has a conical bottom which collects a slurry or sludge of solid particulates. The concentrated slurry may be removed through slurry outlet 76.

Burner 14 may take the form of any of a number of conventional dispersing or atomizing burners having a flame jet 22 emitted from its burner opening. Combustion chamber 23 is conventionally arranged to feed into bubble distributor 24, which may take any of a various number of forms, but which in one preferred form is a perforated cylindrical tube 24 disposed crosswise to combustion chamber 23 and having a plurality of openings 25 disposed in the lowermost surface of the chamber 25. Air or combustion gases are heated and forced into the distribution tube 24 and through openings 25 thereafter traveling upward in the solution 26 as shown by the arrows. For convenience, the exhaust gases from the combustion chamber 25 and the resultant gas bubbles may be referred to as exhaust air or air bubbles. Of course, distribution tubes 24 may take any shape (e.g. S-shape, cross shape, etc . . . ) to facilitate distribution of the bubbles throughout the solution. Distributor 24 should preferably be disposed at the lowermost portion of the tank for maximum contact of the bubbles as they rise through solution 26 to level 30. However, it has been found that due to efficiency of the system, the hot gases from distributor 24 can be allowed to enter at a shallow level above the midpoint of the tank. This indicates that a relatively long shallow tank can be used, i.e. one whose length is at least twice its height. This is important where weight distribution of equipment is of particular concern.

In operation, tank 12 is partially filled with a solution such as water 26, which is continuously decanted into tank 12 through solution inlet means 28 and valve 20. Regulating means may be utilized to maintain solution 26 at a level 30 by monitoring the level of the solution 26 in tank 12 and regulating the amount of solution decanted into the tank through valved solution inlet means 28. Burner 14 has disposed around the burner opening 16 a baffled combustion tube 23 which normally extends to the base of the tank where it connects to distributor 24. Perforations or openings 25 in bubble distributor 24 may be in a prearranged pattern to help distribute the bubbles evenly throughout the solution for maximum evaporation rate of the solution due to contact between the surface area of the bubbles and the solution 26.

Due to evaporation, the bubbles are saturated with volatile components of the solution. As bubbles break the surface so, the vapor collects in the area or space 35 and is drawn through an outlet 37 in tank 12 via a connecting duct 38 to tank 40. Duct 37 connects the space 31 of first tank 12 with the interior 36 of second tank 40 which contains a heat exchanger condenser 41. Condenser 41 may be of conventional design such as a shell-in tube type comprising an insulated plurality of tubes supported in an outer shell. Chill water is fed into the tubes 42 which are interconnected such that chill water fed into the condenser inlet 43 passes through the tubes and exits through a condensate discharge 44. A pump not shown in FIG. 3 may be provided to circulate the spent chill water and pass it to a cooler. Each of the condenser tubes is arranged to allow maximum contact between the evacuated gas from tank 10 and the surface are of the tubes. As the gases pass over and contact the tube skin, the gases are condensed and the condensate collected at 46 and drawn off via pump 45 and collected at 47.

Any volatile components having boiling points below that of the condensing liquid boiling point are thus separated and collected as a condensing liquid 47. The vapor phase in the meantime is collected in an exhaust collecting area 48 above the level of the condenser 41 and drawn out through vacuum pump 49.

The gas collected in area 48 has been mostly cleansed of particulates dissolved in the starting solution. Its condensate may contain, for example light hydrocarbons components, such as the light end oils which will float to the surface of the liquid 46, to create a second predetermined level 47'. Particulates, such as tars or heavier oils, tend to sink to the bottom of the condensed liquid and can be collected by conventional heavy component removal members illustrated diagrammatically at 76'. For a more efficient separation of the heavier components from the condensing or solution liquids, a deemulsifier 51, such as one manufactured by Emulsions Control Co. under the brand name of ECO RECOVERALL, may be added to either of the liquids in the tanks. The de-emulsifier may be an additive provided to the solution 26 before or after it is decanted into tank 12 or a de-emulsifier additive device may be disposed within the vapor collecting area to release deemulsifier into the condensate liquid in measured doses.

Vacuum draft pump 49, is arranged to create a partial vacuum in the second tank 40. A partial vacuum in a range of from about 2.0 to about 10.0 inches Hg (about 50 to about 260 millibars) is established in the second tank 40. Preferably a partial vacuum pressure of approximately 4.5 inches Hg (115 millibars) is utilized. A partial vacuum will also be drawn in tank 12 through connecting duct 38. The vacuum pump 49 may alternatively be disposed between tanks 12 and 40, particularly where its desired to draw a higher vacuum in tank 12. The partial vacuum in tank 12 is maintained in the range between 0.1 to 4.0 inches Hg (about 2 to about 90 millibars) during operation. This range has been found to produce good results with optimum results being achieved with a partial vacuum pressure of approximately 2.5 inches Hg (60 millibars).

The partial vacuum pressure in each of the of the tanks is the amount of pressure in the appropriate units below ambient atmospheric pressure. For instance, a partial vacuum pressure of 4.5 inches Hg tank 40 means a pressure in tank 40 which is 4.5 inches Hg less than atmospheric pressure, or about 25.5 inches Hg at sea level.

Vacuum draft means 49 may be a conventional, commercial vacuum pump. The output gases from pump 49 may be vented directly to the atmosphere or through an exhaust pipe 50. If desired they may first be filtered through a suitable filter such as a charcoal high efficiency particle air (H.E.P.A.) filter before being vented to the atmosphere. In that event another optional blower may be utilized. The filter removes any odors that may remain in the exhaust as well as any smoke or other particulates and to this end the filter may be disposed in the flow line directly after the vacuum pump 49.

FIG. 3 illustrates an alternative system of the present invention employing a submerged condenser.

A combustion chamber 23 in the form of a cylindrical pipe encloses flame 22 and directs the flame from burner 14 into a one shaped bubble distributor 24 having a plurality of apertures 25. As shown, at least two annular rows of apertures are utilized; however, the apertures may also be randomly spaced and more or less these two rows may be used. The lower end of distributor 24 is closed off with a plate to ensure that all the air is forced through the apertures on all sides in this form of bubbles through the solution 26 in tank 12. Tank 12 has a conical bottom 72 which collects a slurry or sludge of solid particulates 74. Slurry collects as a result of the natural tendency of the concentration of a solute in a solvent as the solvent is boiled or evaporated and of heavier matter to sink as it precipitates out of solution. In the present case, slurry 74 collects as the air heated by the flame jet 22 passes through the solution in the form of hot air bubbles causing the solvent of solution 26 to vaporize. The constituent portions of slurry 74 may include heavy tar-like oils or solid particulate matter such as dirt or other impurities which are not easily vaporized. The agitation of the water due to the bubbling enhances the rate of dropout. The concentrated slurry may be removed through outlet 76 and then transferred to a safe disposal site or other appropriate area. Such transfer avoids the expense of transferring the solvent in the solution, which normally requires special equipment and special handling.

Gas collected above the surface 30 of the solution in area 31 of tank 12 is drawn into condenser 40 through insulated connecting conduct 38 as shown by the directive arrows.

Cooling of the condensing liquid may be affected by any of a number of means such as a cooling tank 60, as shown, or a refrigeration system, cooling tower, heat exchanger or a combination of cooling systems. Cooling tank 60 includes a lower inlet 63 connected by a pipe 62 to an outlet 65 of tank 41 for transferring condensing liquid to the cooling tank 60 where it is maintained and cooled until it is ready for use in the condensing tank. A second insulated return duct or pipe 64 is used of for returning cooled condensing liquid to the condensing tank 40, the direction of flow being shown by arrows. Pipe 64 may include radiating or heat sink means 66 and fan means 68 for directing air over the radiator 66 for carrying away heat and thereby further cooling the condensing liquid before returning it to the condensing tank 40. Fan 68 may be a conventional electric fan connected to an electric motor (not shown) and disposed to cause air to pass over heat sink means 66 so as to cool the liquid contained in the pipes and passing through the radiator.

Tank 40 includes a cylindrical feed tube 55 having a conical gas dispersing apertured head disposed in the solution 56. The conical head of tubes 55 includes annular spaced rows of apertures 57 to facilitate gas dispersion. Tank 40 also includes particulate collecting and removal members illustrated diagrammatically at 76'. Tank 50 is connected to a vacuum draft pump 49 which establishes the partial vacuum in tanks 40 and 12 as herein before described.

The partial vacuum in the tanks provides several advantages. For example, the partial vacuum results in the reduced boiling point of the solution, including both the solute and the solvent, to about 160° F. as shown in FIG. 1. Also the condensation point of the gaseous exhaust injected into the liquid 56 in tank 40 is reduced. Another advantage of maintaining a partial vacuum in tanks 12 and 40 is that it allows for the hot gases to be drawn into and through the solution 26 more efficiently. As previously noted, the bubble size is larger than in non-vacuum systems. This enables a larger surface area of the bubbles to contact the solution 26 causing more rapid evaporation. More of the solvent and solute in thus carried by the gas which rise through the solution 26 before being drawn to condensing tank 40.

The exhaust system for the gases being drawn off by a vacuum pump 49 further includes an exhaust duct 58 within which may be disposed a charcoal filter 53 and high-efficiency particulate air (H.E.P.A) filter 54. The exhaust vented out through the exhaust duct 58 thus is cleansed by the filters which minimize the possibility of pollution of the environment. Filters 53, 54 may alternatively be disposed in line before vacuum means 49 at the outlet from tank 40 or in conduit 38.

In operation of the system according to the present invention exhaust gases from the tank 12 are drawn through duct 38 and into pipe 55 which is disposed below level 50. The gases drawn through connecting duct 38 enter the submerged pipe 55 and are advantageously broken up into bubbles by the apertures 57 in the cone shaped head that act as a bubble dispersion mechanism. As the bubbles rise to the surface of the condensing tank 40, any gases having a boiling point less than the temperature of the condensing liquid 56 are condensed out of the bubbles and into the liquid 56. The gases which rise in bubble form through condensing liquid 56 rise above surface 50 and into the exhaust collecting area 36 where they are drawn off by the vacuum draft pump 49. Vacuum pump 49 draws off the exhaust gases through duct 58 and through filters 53, 54 as described above.

FIG. 4 shows another alternative embodiment of the present invention. A first tank 12, enclosed and substantially sealed to the environment contains the liquid to be treated. Burner 14 is supported in a known manner adjacent and above a combustion chamber 23. Burner 14 includes valved fuel and air inlets, for providing fuel and combustion air, respectively in the proper mixture to the burner 14. The output of burner 14 is flame 22 directed into chamber 23. Burner 14 may take the form of any of a number of conventional dispersing or atomizing burners.

In operation, tank 12 is partially filled with a solution 26 which is continuously decanted into tank 12 through inlet means 28. Regulating means may be utilized to maintain solution 26 at a predetermined level 30 by monitoring the level of the solution decanted into the tank 12 and regulating the amount of solution decanted into the tank through the inlet means 28. The baffled combustion chamber 23 of burner 14 takes the form of an "L", having a horizontally extending distributing section 24 disposed below the level 30 of the solution. The burner flame jet 22 projects below the level of the solution 30 and produces high temperature gases in distributor 24 which pass through apertures 25 and into the solution. Gases bubble upward into the upper vapor collecting area 37 of tank 12. Distributing section 24 extends substantially the entire length of tank 12 and includes apertures 25 along its length to distribute the bubbles evenly throughout the solution for increased evaporation of the solution due to contact with the surface area of the bubbles effects.

As the vapor collects in the vapor collecting area 31, it is drawn through an insulating connecting duct 38 which connects the outlet 37 of first tank 12 with the interior of second tank 40. Second tank 40 contains a condensing liquid 50 which is maintained at a predetermined level. Duct 38 forms an inlet conduit for tank 40 and is connected to a vertical apertured pipe 41 adapted to extend below level 56 of the condensing liquid 42. Pipe 41' preferably includes spaced apertures for dispersion of the vapor uniformly into the condensing liquid 50.

As the hot gas is injected into the second tank 40, through the pipe 41', the gases bubble up through the condensing liquid 50. The constituent elements of the exhaust gas are separated and any volatile components having boiling points below that of the condensing liquid boiling point are then condensed in condensing liquid 50. The dissolved gases are collected in an exhaust collecting area 48 above the level of the solution in tank 40.

The gas collected in area 48 is cleansed of particulates and components which have condensed out in either or both of the tanks. Light hydrocarbon components, such as the light end oils, if present, condense and float to the surface of the second tank adjacent forming a top level 47. Heavier particulates, such as tars or heavier oils, sink to the bottom of the either or both of the tanks and can be collected by conventional heavy component removal members.

For a more efficient separation of the heavier components from the condensing or solution liquids, a de-emulsifier, such as one manufactured by Emulsions Control Inc. under the brand name of ECI RECOVERALL, may be added to either of the liquids in the tanks. The de-emulsifier may be an additive provided to the solution 26 before it is decanted into tank 12 or a deemulsifier additive device 51 may be disposed within area 48 which releases de-emulsifier into condensing liquid in measured doses.

The gases removed from exhaust collecting area 48 may be vented directly to the atmosphere or, may first be filtered through a charcoal filter and a High Efficiency Particle Air (H.E.P.A) filter before being vented to the atmosphere to remove any odors that may remain in the exhaust. The H.E.P.A. filter also removes any smoke or other particulates which remain in the exhaust. Further filters 53, 54 may be disposed after the vacuum means in the system or alternatively in the duct between second tank 40 and vacuum means 49, at both locations.

Various modifications in the design and operation of the present invention will suggest themselves to those skilled in the art. The embodiment and methods described above are presented in all respects as illustrative and not restrictive and resort should be made to the appended claims which define the true spirit and full scope of the invention.

What is claimed is:

1. A vacuum draft submerged combustion system for separating unwanted constituents of liquid comprising: a first closed tank including fluid inlet means, means for introducing a liquid into the first tank and means for maintaining the liquid in the first tank at a predetermined level, said first tank having an exhaust outlet and a solid particulate collection section at a lowermost portion thereof and means for removing solid particulates collected therein, a burner for burning a combustible fuel and heating a source of air, a conduit combustion chamber connected to said burner and disposed in said first tank below the level of said liquid for supplying heated air to the liquid; a bubble distributing means connected to said combustion chamber for receiving said heated air and disposed along a lowermost portion of said first tank for distribution of heated air bubbles in said liquid in a predetermined pattern, a second closed tank for maintaining a liquid at a predetermined level, said second tank having an inlet and an exhaust outlet, insulating duct means connecting the inlet of said second tank to the exhaust outlet of said first tank, and bubble distributing means within said second tank, said bubble distributing means including a conduit extending from the inlet of said second tank to a portion below the level of the liquid and means disposed at the end of said conduit for distribution of air bubbles drawn from said first tank into said liquid in the second tank, said second tank further including a solids particulate collection section at a lowermost portion thereof and means for removing solid particulates collected therein, and vacuum pump means connected to the outlet of said second tank for simultaneously drawing a partial vacuum in said first tank in the order of approximately 0.1 to 4.0 inches Hg (2 millibars to 90 millibars) and in said second tank in the order of approximately 2.0 inches Hg (50 millibars) to 10.0 inches Hg (260 millibars) to thereby significantly reduce the boiling point of liquids in the tanks and causing the bubbles flowing upwardly through the liquid to expand to a degree greater than that of a pressurized system to thereby provide an increased surface area of contact of the bubbles with the liquid and be drawn upward and outward serially through the liquid in the first and the second tanks for condensing the separated constituents, and means for venting uncondensed vapor portions of the vapor phase of the bubbles being drawn through the pump to the atmosphere.

2. The system according to claim 1 wherein said first tank includes means for adding a deemulsifier to said liquid.

3. The system according to claim 1 wherein during operation, said partial vacuum in said first tank is approximately 2.5 inches Hg (62.5 millibars) and said partial vacuum in said second tank is approximately 4.5 inches Hg (115 millibars).

4. A combustion system as set forth in claim 1 wherein said bubble distributing means in the first tank is a conical head, said head being connected at one end to the combustion chamber in the first tank and closed off at an opposite end and having a plurality of spaced openings for discharge of air bubbles.

5. A combustion system as set forth in claim 4 wherein the openings are disposed in multiple rows peripherally about the head in a predetermined pattern.

6. A combustion system as set forth in claim 1 wherein said bubble distributing means in the second tank is a conical head, said head being connected at one end to the conduit in said second tank and closed off at an opposite end and having a plurality of spaced openings for discharge of air bubbles.

7. A combustion system as set forth in claim 6 wherein the openings are disposed in multiple rows peripherally about the head in a predetermined pattern.

8. A combustion system as set forth in claim 1 wherein the bubble distributing means in the first tank is a conduit disposed substantially horizontally along the length of the first tank, said conduit having a plurality of spaced openings for discharge of air bubbles into the first tank.

9. The system according to claim 1 further including means connected to said second tank for cooling the liquid in said second tank.

10. The system according to claim 1 including means for cooling liquid in said second tank.

11. A combustion system as set forth in claim 1 further including a cooling tank, first conduit means connected between said cooling tank and said second tank for transferring liquid to said cooling tank from said second tank, second conduit means connected between said cooling tank and said second tank for returning cooled liquid to said second tank and further including heat sink means connected to said second conduit for further cooling the liquid returning to said second tank.

* * * * *

UNITED STATES PATENT AND TRADEMARK OFFICE
CERTIFICATE OF CORRECTION

PATENT NO. : 5,032,230

DATED : July 16, 1991

INVENTOR(S) : Richard C. Shepherd

It is certified that error appears in the above-identified patent and that said Letters Patent is hereby corrected as shown below:

Col. 2, line 18 delete "inefficient" and Substitute --high cost of--.

Col. 2, line 41 delete "in" and substitute --is--.

Col. 2, line 42 delete "size" and substitute --surface area--.

Col. 2, line 54 after "vacuum" insert --or reduced pressure below ambient pressure--.

Col. 2, line 62 after "relative" delete "bubble" and substitute --surface--.

Col. 4, line 21 delete "which are ar a temperature in the order of 1200°F."

Col. 5, line 44 delete "the surprising and unexpected" and change "result" to --results--.

Col. 5, line 50 delete "While the" and substitute --The--.

Col. 5, line 50 delete "and" and substitute --that--.

Col. 5, line 50 delete "effects of the".

Col. 5, line 51 delete "are".

UNITED STATES PATENT AND TRADEMARK OFFICE
CERTIFICATE OF CORRECTION

PATENT NO. : 5,032,230

DATED : July 16, 1991

INVENTOR(S) : Richard C. Shepherd

It is certified that error appears in the above-identified patent and that said Letters Patent is hereby corrected as shown below:

Col. 5, line 52 delete "not entirely understood, it is believed that the results are" and substitute --is superior to force draft submerged combustion is--.

Col. 5, line 64 delete "@ 1200°F.   2.99   2.81   2.65"

Col. 6, lines 1, 2, and 3 delete

"_____"
"   @ 1200°F.        3.42         3.68         3.99      "
"_____"

Col. 6, line 7 delete "50%" and substitute --25%--.

Col. 6, line 14 delete "can be seen" and substitute --was determined--.

Col. 6, line 14 delete "with a" and substitute --for a vacuum draft combustion system--.

Col. 6, line 20 delete "35" and substitute --3.5--.

UNITED STATES PATENT AND TRADEMARK OFFICE
CERTIFICATE OF CORRECTION

PATENT NO. : 5,032,230

DATED : July 16, 1991

INVENTOR(S) : Richard C. Shepherd

It is certified that error appears in the above-identified patent and that said Letters Patent is hereby corrected as shown below:

Col. 6, line 24 delete "30%" and substitute --70%--.

Signed and Sealed this

Thirtieth Day of November, 1993

Attest:

BRUCE LEHMAN

*Attesting Officer*   *Commissioner of Patents and Trademarks*